(12) United States Patent
Usami et al.

(10) Patent No.: US 12,143,711 B2
(45) Date of Patent: Nov. 12, 2024

(54) IMAGE-CAPTURING APPARATUS

(71) Applicant: CANON KABUSHIKI KAISHA, Tokyo (JP)

(72) Inventors: Takahiro Usami, Tokyo (JP); Yasushi Ohwa, Tokyo (JP); Hiroyasu Katagawa, Kanagawa (JP); Tomotaka Uekusa, Kanagawa (JP); Yukihiro Kogai, Tokyo (JP); Toru Aida, Tokyo (JP); Hiroyuki Yaguchi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/854,005

(22) Filed: Jun. 30, 2022

(65) Prior Publication Data
US 2023/0011551 A1 Jan. 12, 2023

(30) Foreign Application Priority Data
Jul. 8, 2021 (JP) .................................. 2021-113636

(51) Int. Cl.
*H04N 23/611* (2023.01)
*H04N 23/65* (2023.01)
*H04N 23/695* (2023.01)

(52) U.S. Cl.
CPC ......... *H04N 23/651* (2023.01); *H04N 23/611* (2023.01); *H04N 23/695* (2023.01)

(58) Field of Classification Search
CPC .. H04N 23/651; H04N 23/611; H04N 23/695; H04N 23/45; H04N 23/675
See application file for complete search history.

(56) References Cited

U.S. PATENT DOCUMENTS

| | | | |
|---|---|---|---|
| 2015/0138390 A1* | 5/2015 | Tomosada | H04N 23/71 348/222.1 |
| 2019/0101980 A1* | 4/2019 | Stafford | G02C 11/10 |
| 2023/0131361 A1* | 4/2023 | Mitsugi | G03B 13/02 396/51 |

FOREIGN PATENT DOCUMENTS

| | | |
|---|---|---|
| JP | 02-65836 A | 3/1990 |
| JP | 08-29826 A | 2/1996 |
| JP | 2016-048863 A | 4/2016 |

* cited by examiner

*Primary Examiner* — Tat C Chio
(74) *Attorney, Agent, or Firm* — Cowan, Liebowitz & Latman, P.C.

(57) ABSTRACT

An image-capturing apparatus according to the present invention includes: an image sensor; a gaze detecting sensor configured to detect a gaze of a user; and at least one memory and at least one processor which function as: an object-detecting unit configured to detect an object from an image captured by the image sensor; and a control unit configured to, if the object-detecting unit detects an object of a specific type in a case where a state of the gaze detecting sensor is a first state for detecting the gaze, change the state of the gaze detecting sensor to a second state in which an electric power consumption of the gaze detecting sensor is less than in the first state.

22 Claims, 9 Drawing Sheets

IMAGE-CAPTURING APPARATUS

BACKGROUND OF THE INVENTION

Field of the Invention

The present invention relates to an image-capturing apparatus, and more particularly to a technique for detecting the gaze of a user of the image-capturing apparatus.

Description of the Related Art

An image-capturing apparatus such as a digital camera is known to have functions including a main-object determining function, an object-tracking function, and a gaze detecting function. The main-object determining function selects (determines) a target main object for autofocusing (AF), tracking, or the like from one or more objects present in the captured image. The object-tracking function tracks an object, and the gaze detecting function detects the gaze of the user of the image-capturing apparatus.

Japanese Patent Application Publication No. 2016-48863 discloses a technique for determining, as the main object, an object that has performed a specific action. Japanese Patent Application Publication No. H8-29826 describes a technique for detecting the position to which the gaze of the user of the image-capturing apparatus is directed, detecting a feature of the object present at the detected position, and tracking the object on the basis of the detected feature. Japanese Patent Application Publication No. H2-65836 discloses a technique for irradiating the eye with infrared light, capturing an image of the reflected light from the eye, detecting the position of the Purkinje image and the center position of the pupil from the captured image, and detecting the direction of the gaze on the basis of the detected positions.

To detect the movement of the gaze with high accuracy, the execution cycle of gaze detection needs to be short. However, a shorter execution cycle of gaze detection increases the power consumption of the image-capturing apparatus.

SUMMARY OF THE INVENTION

The present invention provides a technique that can reduce the power consumption of an image-capturing apparatus capable of detecting the gaze of the user.

The present invention in its first aspect provides an image-capturing apparatus including: an image sensor; a gaze detecting sensor configured to detect a gaze of a user; and at least one memory and at least one processor which function as: an object-detecting unit configured to detect an object from an image captured by the image sensor; and a control unit configured to, if the object-detecting unit detects an object of a specific type in a case where a state of the gaze detecting sensor is a first state for detecting the gaze, change the state of the gaze detecting sensor to a second state in which an electric power consumption of the gaze detecting sensor is less than in the first state.

The present invention in its second aspect provides an image-capturing apparatus including: an image sensor; a gaze detecting sensor configured to detect a gaze of a user; and at least one memory and at least one processor which function as: an object-detecting unit configured to detect an object from an image captured by the image sensor; and a control unit configured, in a state of the gaze detecting sensor is a first state for detecting the gaze: to not change the state of the gaze detecting sensor even if the object-detecting unit detects a plurality of human bodies and at least one ball; and to change the state of the gaze detecting sensor to a second state in which an electric power consumption of the gaze detecting sensor is less than in the first state if the object-detecting unit detects one human body and at least one ball.

The present invention in its third aspect provides a control method of an image-capturing apparatus including an image sensor and a gaze detecting sensor configured to detect a gaze of a user, the control method including: a step of detecting an object from an image captured by the image sensor; and a step of, if an object of a specific type is detected from the image in a case where a state of the gaze detecting sensor is a first state for detecting the gaze, changing the state of the gaze detecting sensor to a second state in which an electric power consumption of the gaze detecting sensor is less than in the first state.

The present invention in its fourth aspect provides a control method of an image-capturing apparatus including an image sensor and a gaze detecting sensor configured to detect a gaze of a user, the control method including: a step of detecting an object from an image captured by the image sensor; and a step of, in a state of the gaze detecting sensor is a first state for detecting the gaze: not changing the state of the gaze detecting sensor even if a plurality of human bodies and at least one ball are detected from the image; and changing the state of the gaze detecting sensor to a second state in which an electric power consumption of the gaze detecting sensor is less than in the first state if one human body and at least one ball are detected from the image.

The present invention in its fifth aspect provides a non-transitory computer readable medium that stores a program, wherein the program causes a computer to execute a control method of an image-capturing apparatus including an image sensor and a gaze detecting sensor configured to detect a gaze of a user, the control method including: a step of detecting an object from an image captured by the image sensor; and a step of, if an object of a specific type is detected from the image in a case where a state of the gaze detecting sensor is a first state for detecting the gaze, changing the state of the gaze detecting sensor to a second state in which an electric power consumption of the gaze detecting sensor is less than in the first state.

The present invention in its sixth aspect provides a non-transitory computer readable medium that stores a program, wherein the program causes a computer to execute a control method of an image-capturing apparatus including an image sensor and a gaze detecting sensor configured to detect a gaze of a user, the control method including: a step of detecting an object from an image captured by the image sensor; and a step of, in a state of the gaze detecting sensor is a first state for detecting the gaze: not changing the state of the gaze detecting sensor even if a plurality of human bodies and at least one ball are detected from the image; and changing the state of the gaze detecting sensor to a second state in which an electric power consumption of the gaze detecting sensor is less than in the first state if one human body and at least one ball are detected from the image.

Further features of the present invention will become apparent from the following description of exemplary embodiments with reference to the attached drawings.

DESCRIPTION OF THE EMBODIMENTS

First Embodiment

Referring to drawings, a first embodiment of the present invention is now described. The basic operation of an image-capturing apparatus according to the first embodiment of the present invention is described. The image-capturing apparatus according to the first embodiment senses that the user of the image-capturing apparatus looks into the finder (viewfinder) (the user's eye is in proximity to the finder). Then, in an eye-proximity state (a state in which the user's eye is in proximity to the finder), the image-capturing apparatus detects the user's gaze using a gaze detecting unit. Based on the detected gaze, the image-capturing apparatus selects an object to be tracked from the captured image (image of the current frame). Then, when displaying images of the subsequent frames, the image-capturing apparatus generates an image of a tracking frame surrounding the object to be tracked and superimposes it on the captured images.

Figure 1:
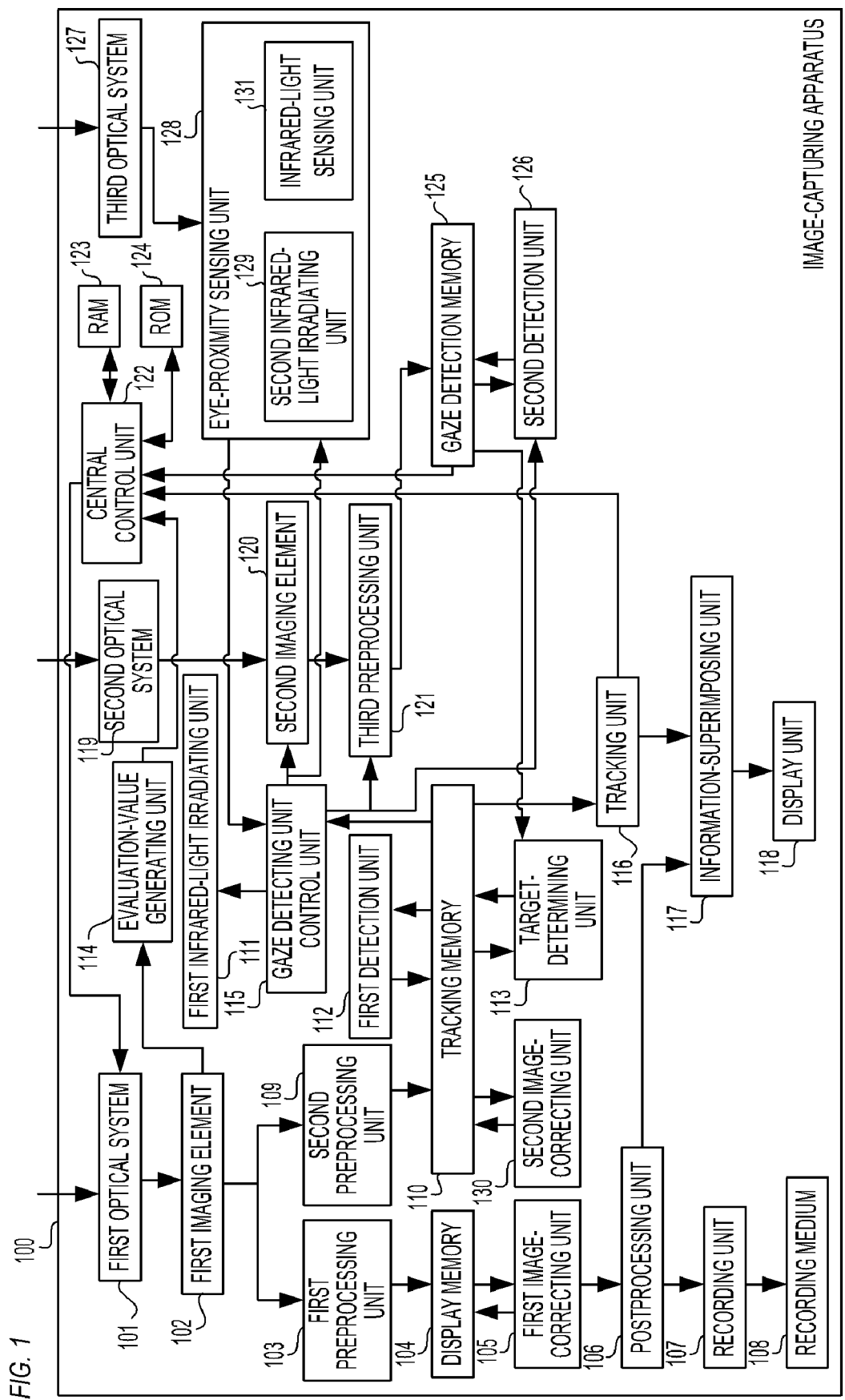
FIG. 1 is a block diagram of an image-capturing apparatus according to a first embodiment.

FIG. 1 is a block diagram schematically showing an example of the internal structure of an image-capturing apparatus 100 according to the first embodiment.

A first optical system 101 has multiple lenses including a movable lens such as a focus lens and forms an optical image of the image area on the imaging surface of a first imaging element 102.

A central control unit 122, which may be a central processing unit (CPU) for example, loads a program stored in a read only memory (ROM) 124 into a random access memory (RAM) 123 and executes the program. The central control unit 122 implements the functions of the image-capturing apparatus 100 by controlling the operation of each component of the image-capturing apparatus 100. The ROM 124 may be a rewritable non-volatile memory, for example, and stores data such as a program that can be executed by the central control unit 122, set values, and a graphical user interface (GUI). The RAM 123 may be a system memory used for loading a program to be executed by the central control unit 122 and storing values required during the execution of the program. Although omitted in FIG. 1, the central control unit 122 is connected to and communicates with the components of the image-capturing apparatus 100.

The first imaging element 102 may be a CMOS image sensor having a color filter of the primary color Bayer arrangement. In the first imaging element 102, multiple pixels, each having a photoelectric conversion area, are two-dimensionally arranged. The first imaging element 102 converts an optical image formed by the first optical system 101 into an electric signal group (analog image signal) using the pixels. The analog image signal is converted into a digital image signal (image data) by an A/D converter of the first imaging element 102 and output. The A/D converter may be external to the first imaging element 102.

An evaluation-value generating unit 114 generates, from the image data obtained from the first imaging element 102, signals and evaluation values used for autofocusing (AF), evaluation values used for automatic exposure control (AE), and the like. The evaluation-value generating unit 114 outputs the generated signals and evaluation values to the central control unit 122. The central control unit 122 controls the position of the focus lens of the first optical system 101 based on the signal and evaluation value obtained from the evaluation-value generating unit 114, the gaze point (line-of-sight position) obtained from a gaze detection memory 125, and the tracking result obtained from a tracking unit 116. Based on these information pieces, the central control unit 122 determines the image-capturing conditions (such as the exposure time, aperture value, and ISO sensitivity). The evaluation-value generating unit 114 may generate a signal or an evaluation value from display image data generated by a postprocessing unit 106 described below.

A first preprocessing unit 103 performs color interpolation on the image data obtained from the first imaging element 102. The color interpolation is a process of converting each of multiple pixel data pieces (pixel values) forming image data into pixel data having values of the R component, the G component, and the B component, and is also called demosaicing. If necessary, the first preprocessing unit 103 may perform reduction to reduce the number of pixels and thus lower the processing load. The first preprocessing unit 103 stores the processed image data in a display memory 104.

On the image data stored in the display memory 104, a first image-correcting unit 105 performs processing such as correction, including white balance correction and shading correction, and conversion from the RGB format to the YUV format. The first image-correcting unit 105 outputs the processed image data to the postprocessing unit 106. The first image-correcting unit 105 may perform correction using the image data of one or more frames different from the frame to be processed among the image data stored in the display memory 104. For example, the first image-correcting unit 105 may perform correction using the image data of one or more frames before and/or after the frame to be processed in a time series.

The postprocessing unit 106 generates recording image data and display image data from the image data obtained from the first image-correcting unit 105. For example, the postprocessing unit 106 performs coding on the image data and generates a data file storing the coded image data as recording image data. The postprocessing unit 106 outputs the recording image data to a recording unit 107. The display image data is image data to be displayed on a display unit 118, and has a size corresponding to the display size on the display unit 118. The postprocessing unit 106 outputs the display image data to an information-superimposing unit 117.

The recording unit 107 records the recording image data obtained from the postprocessing unit 106 on a recording medium 108. The recording medium 108 may be a semiconductor memory card, an embedded non-volatile memory, or the like.

A second preprocessing unit 109 performs color interpolation (demosaicing) on the image data obtained from the first imaging element 102. If necessary, the second preprocessing unit 109 may perform reduction to reduce the number of pixels and thus lower the processing load. The second preprocessing unit 109 stores the processed image data in a tracking memory 110. The tracking memory 110 and the display memory 104 may have different address spaces in the same memory. The first and second preprocessing units 103 and 109 may be the same (common) preprocessing unit.

On the image data stored in the tracking memory 110, a second image-correcting unit 130 performs processing such as correction, including white balance correction and shading correction, and conversion from the RGB format to the YUV format. The second image-correcting unit 130 stores the processed image data in the tracking memory 110. The second image-correcting unit 130 may perform image processing for obtaining image data suitable for object detection. For example, when the representative brightness of image data (for example, the average brightness of all pixels) is less than or equal to a predetermined threshold, the second image-correcting unit 130 may multiply all pixel data pieces of the image data by the same coefficient (gain) so as to obtain image data with a representative brightness higher than the predetermined threshold. The second image-correcting unit 130 may perform correction using the image data of one or more frames different from the frame to be processed among the image data stored in the tracking memory 110. For example, the second image-correcting unit 130 may perform correction using the image data of one or more frames before and/or after the frame to be processed in a time series.

It should be noted that the components concerning the object-tracking function, such as the second preprocessing unit 109 and the second image-correcting unit 130, do not have to operate when the object-tracking function is not performed. The image data to which the object-tracking function is applied is moving image data that is captured for live view display or recording, and has a predetermined frame rate of 30 fps, 60 fps, or 120 fps, for example.

A first detection unit 112 detects at least one area of an object of a predetermined type (object area) from the image data of one frame stored in the tracking memory 110 by the second image-correcting unit 130. The first detection unit 112 stores the detection result of the object area (object-detection result) in the tracking memory 110. For example, an object-detection result may include the following information for each object area. Additionally, an object-detection result may include the number of detected object areas for each type of object (object class described below).

Position and size of the object area
   Object class representing the type of the object (such as automobile, airplane, train, bird, insect, human body, head, eye, face, cat, dog, flower, fish, ball)
   Object state information 1 indicating whether an eye is detected in the object area
   Object state information 2 indicating whether a face and/or head is detected in the object area
   Object state information 2 may indicate the face orientation such as "forward", "backward", and "sideways". The object-detection result may include the reliability of the information included in the object-detection result. Since a head, face, eye, and the like are parts of a human body, cat, dog, and the like, they can be considered as partial objects. The object classes "head", "face", "eye", and the like may be considered as partial object classes. The first detection unit 112 may detect a wearable object such as a helmet as the object that wears the wearable object. For example, the first detection unit 112 may detect a helmet as a head.

The first detection unit 112 can detect object areas using a known technique for detecting feature areas such as a face area of a person or an animal. For example, a class classifier trained using training data may be used as the first detection unit 112. There is no limitation to the identification (classification) algorithm. The first detection unit 112 may be obtained by training a classifier that implements multi-class logistic regression, a support vector machine, a random forest, a neural network, or the like.

A second optical system 119 has an eyepiece and an optical-path dividing prism. The second optical system 119 sets the eye of the user (the user of the image-capturing apparatus 100) looking into the eyepiece in the image area, separates the infrared light in the image area with the optical-path dividing prism, and forms an optical image of the separated infrared light on the imaging surface of a second imaging element 120. An image including the user's eye is thus captured. The second optical system 119 also projects the image displayed on the display unit 118 onto the retina of the user looking into the eyepiece. As such, the second optical system 119 also functions as a finder, allowing the user to visually perceive the image displayed on the display unit 118.

An eye-proximity sensing unit 128 (eye-proximity senor) is arranged adjacent to the finder (the second optical system 119) together with a third optical system 127, and senses the presence of an eye in proximity to the finder, assuming that an object approaching the finder is the user's eye. The eye-proximity sensing unit 128 has a second infrared-light irradiating unit 129 and an infrared-light sensing unit 131.

The second infrared-light irradiating unit 129 may be an infrared-light emitting diode and irradiates the user (the eye in proximity to the finder; the eye looking into the finder) with infrared light. When there is a shielding object such as an eye near the finder, the infrared light emitted from the second infrared-light irradiating unit 129 passes through the third optical system 127, is applied to and reflected on the shielding object, and is then incident on the infrared-light sensing unit 131 through the third optical system 127.

The infrared-light sensing unit 131 senses the incident infrared light and calculates the distance between the eye-proximity sensing unit 128 and the shielding object from the time difference between the time when the second infrared-light irradiating unit 129 emits the infrared light and the time when the infrared-light sensing unit 131 senses the infrared light. The eye-proximity sensing unit 128 determines whether the eye is in proximity (whether the user is looking into the finder) according to the calculated distance. The infrared-light sensing unit 131 notifies a gaze detecting unit control unit 115 of information as to whether the eye is in proximity (determination result).

The gaze detecting unit control unit 115 controls the operation of the gaze detecting unit, which detects the user's gaze. For example, the gaze detecting unit control unit 115 receives a notification from the eye-proximity sensing unit 128 as to whether the eye is in proximity. When the eye is in proximity, the gaze detecting unit control unit 115 enables the operation of the gaze detecting unit so that gaze detection (operation of detecting the user's gaze) is performed. When the eye is not in proximity, the gaze detecting unit control unit 115 disables (stops) the operation of the gaze detecting unit so that gaze detection is not performed. The gaze detecting unit (gaze detecting sensor) may include a first infrared-light irradiating unit 111 (irradiation member), the second imaging element 120 (image sensor), a third preprocessing unit 121 (processor), and a second detection unit 126 (detector), for example.

The first infrared-light irradiating unit 111 may be an infrared-light emitting diode and irradiates the user (the eye in proximity to the finder; the eye looking into the finder) with infrared light. When the user is looking into the eyepiece of the second optical system 119, the infrared light emitted from the first infrared-light irradiating unit 111 is reflected on the user's eye looking into the eyepiece. The infrared light reflected on the eye is then separated by an optical-path dividing prism of the second optical system 119 and forms an image on the second imaging element 120.

For example, the second imaging element 120 may be a CMOS image sensor having a color filter that transmits infrared light. In the second imaging element 120, multiple pixels, each having a photoelectric conversion area, are two-dimensionally arranged. The optical image formed by the second optical system 119 by separating infrared light with the optical-path dividing prism is converted by the second imaging element 120 into an electric signal group (analog image signal) using the pixels. The analog image signal is converted into a digital image signal (image data) by an A/D converter of the second imaging element 120 and output. The A/D converter may be external to the second imaging element 120. When the user is looking into the eyepiece of the second optical system 119, the second imaging element 120 captures image data of the user (specifically, the user's eye looking into the eyepiece).

On the image data obtained from the second imaging element 120, the third preprocessing unit 121 performs processing, such as filtering for removing a signal component having a specific spatial frequency band, and reduction for reducing the number of pixels. The third preprocessing unit 121 stores the processed image data in the gaze detection memory 125.

The second detection unit 126 detects the user's gaze based on the image captured by the second imaging element 120. Various conventional techniques can be used to detect the gaze. For example, the second detection unit 126 reads out the image data stored in the gaze detection memory 125, and detects the Purkinje image and the iris from the read image data. The Purkinje image is an image of the infrared light emitted from the first infrared-light irradiating unit 111 and reflected on the cornea, and is also called a corneal reflection image. The first infrared-light irradiating unit 111 has multiple infrared light sources (for example, four infrared-light emitting diodes), and the second detection unit 126 detects multiple Purkinje images each corresponding to one of the infrared light sources. Then, the second detection unit 126 detects the user's gaze based on the positions of the Purkinje images and the center position of the iris, and stores the gaze detection result in the gaze detection memory 125. For example, based on the positions of the Purkinje images and the center position of the iris, the second detection unit 126 calculates the position on the display unit 118 at which the user is gazing. Then, the second detection unit 126 converts the calculated position into a position on the image data, and stores the converted position in the gaze detection memory 125 as the gaze point, which is the gaze detection result. As the gaze detection result, other information may be stored such as the position before conversion and the angle indicating the direction of the gaze.

A target-determining unit 113 determines, as the tracking target, one of the one or more object areas detected by the first detection unit 112. For example, the target-determining unit 113 reads out the gaze point stored in the gaze detection memory 125, and determines the object area closest to the gaze point as the tracking target. The target-determining unit 113 may determine whether the object class of the object area is a specific object class. Then, the target-determining unit 113 may determine an object area of a specific object class (object of a specific type) as the tracking target without using the gaze point. The specific object class (specific type) will be described below. When there are multiple object areas of specific object classes, the target-determining unit 113 may determine, as the tracking target, the object area closest to the gaze point among the multiple object areas. The target-determining unit 113 stores, as tracking target information, information indicating the object area determined as the tracking target in the tracking memory 110.

Based on the tracking target information stored in the tracking memory 110, the tracking unit 116 estimates, as the tracking area, an area corresponding to the object area of the tracking target from the image data of the frame to be processed (current frame) (tracking process of tracking the object (area)). There is no limitation to the method for estimating the tracking area. For example, the image data of the current frame and the image data of a past frame captured before the current frame (e.g., the last frame) are used to estimate, as the tracking area, the area of the current frame corresponding to the object area of the tracking target. Then, the tracking unit 116 obtains the position and size of the estimated tracking area as the tracking result, and outputs the tracking result to the central control unit 122 and the information-superimposing unit 117.

Here, the object area of the current frame determined as the tracking target by the target-determining unit 113 is not the area of the current frame estimated by the tracking unit 116. The tracking unit 116 estimates the area of the current frame corresponding to the object area of a past frame determined by the target-determining unit 113 as the tracking target. The tracking target information obtained by the target-determining unit 113 by determining an object area of the current frame as the tracking target is used when the tracking unit 116 performs tracking processing for the next frame.

The target-determining unit 113 may update the tracking target information for each frame, or it may not update the tracking target information until another object area is determined as the tracking target and then update the tracking target information when another object area is determined as the tracking target. When the tracking unit 116 performs tracking processing based on the similarity with the color composition information of the object area of the tracking target, the color composition information of the object area of the tracking target may be updated to the color composition information of the estimated tracking area to be used for the tracking processing of the next frame. The tracking unit 116 may estimate the tracking area by pattern matching using the object area of the tracking target as the template. The tracking unit 116 may estimate the position and size of the tracking area using a trained multi-layer neural network including convolutional layers.

The information-superimposing unit 117 generates an image of the tracking frame based on the size of the tracking area estimated by the tracking unit 116. For example, the tracking frame image may be an image of a rectangular frame circumscribing the tracking area. Based on the position of the tracking area, the information-superimposing unit 117 generates composite image data by performing composition on the display image data obtained from the postprocessing unit 106 to superimpose the tracking frame image so that the tracking frame is displayed at the position of the tracking area. The information-superimposing unit 117 may generate an image representing the current set values and the state of the image-capturing apparatus 100, and superimpose the generated image through composition so that the generated image is displayed at a predetermined position. The information-superimposing unit 117 outputs the composite image data to the display unit 118.

The display unit 118 may be a liquid crystal display or an organic EL display, for example, and displays an image based on the composite image data output by the information-superimposing unit 117.

By the series of processes described above, the live view display for one frame is performed.

Here, the gaze detecting unit control unit 115 reads the object-detection result stored by the first detection unit 112 in an eye-proximity state from the tracking memory 110, and further controls the gaze detecting unit based on the read object-detection result.

Figure 2:
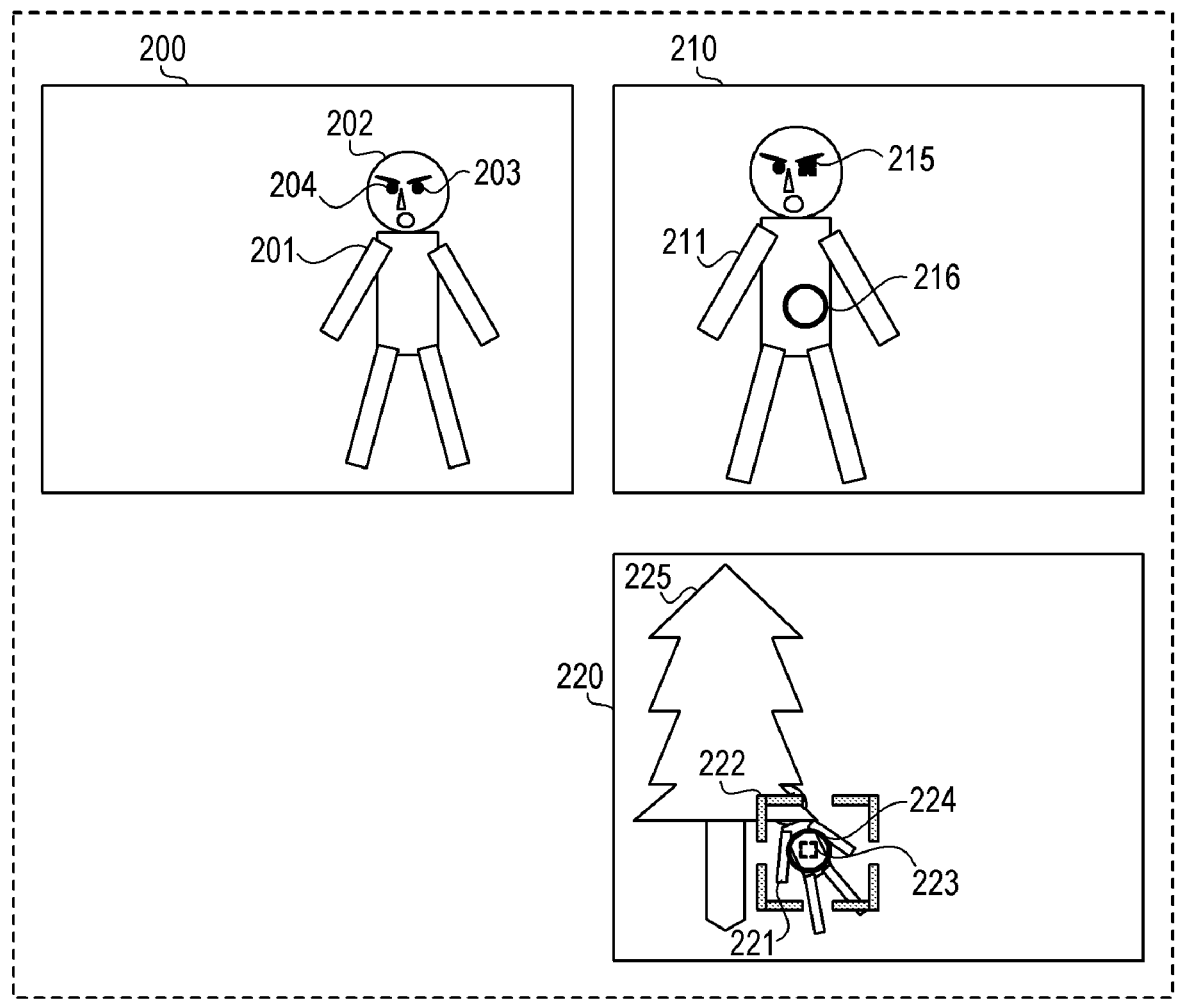
FIG. 2 is a schematic view of images according to the first embodiment.

FIG. 2 shows an example of images captured by the first imaging element 102 and displayed on the display unit 118, gaze points, tracking frame, AF point, and the like. The AF point is the position where autofocusing is performed.

An image 200 is an image captured by the first imaging element 102 and displayed on the display unit 118. The image 200 shows a human body 201 and the face 202 of the human body 201. The image 200 also shows the left eye 203 and the right eye 204 of the face 202. From the image 200 stored in the tracking memory 110, the first detection unit 112 detects an area circumscribing the human body 201 as an object area. Then, the first detection unit 112 generates information on the object area of the human body 201, such as the position and size of the object area of the human body 201, object class "human body", object state information 1 "with eye", and object state information 2 "with face and head". The first detection unit 112 also detects an area circumscribing the face 202 as an object area from the image 200. Then, the first detection unit 112 generates information on the object area of the face 202, such as the position and size of the object area of the face 202, object class "face", object state information 1 "with eye", and object state information 2 "with face and head". The first detection unit 112 also detects an area circumscribing the left eye 203 as an object area from the image 200 and generates information on the object area of the eye 203, such as the position and size of the object area of the eye 203 and object class "eye". The first detection unit 112 also detects an area circumscribing the right eye 204 as an object area from the image 200 and generates information on the object area of the eye 204, such as the position and size of the object area of the eye 204 and the object class "eye". The first detection unit 112 stores the object-detection result including the information on these object areas in the tracking memory 110. The target-determining unit 113 determines the tracking target based on the object-detection result stored in the tracking memory 110 and the gaze point stored in the gaze detection memory 125 by the second detection unit 126. Here, it is assumed that left eye has the highest priority to be determined as the tracking target, followed by right eye, face, and human body in this order. Accordingly, the target-determining unit 113 determines the left eye 203 (specifically, the object area of the eye 203) as the tracking target for the next and subsequent frames.

An image 210 is an image captured multiple frames after the image 200. Since it is after multiple frames, the position and size of the human body 211 in the image 210 are different from those of the human body 201 in the image 200. The tracking unit 116 performs pattern matching using the area of the left eye 203, which is determined by the target-determining unit 113 as the tracking target for a past frame (frame of the image 200), as the template and estimates the area of the left eye in the image 210 (tracking area). The information-superimposing unit 117 generates a tracking frame 215 based on the tracking result (the position and size of the tracking area). Then, the central control unit 122 determines the AF point based on the tracking result, which is output by the tracking unit 116, and the gaze point, which is stored in the gaze detection memory 125 by the second detection unit 126. Here, it is assumed that the position of left eye (tracking result) has the highest priority to be determined as the AF point, followed by the position of right eye (tracking result), the position of face (tracking result), the gaze point, and the position of human body (tracking result) in this order. Accordingly, the central control unit 122 determines, as the AF point, the center position of the tracking area (the center position of the tracking frame 215) estimated as the area of the left eye, and performs focus-lens control based on the calculation result on the distance to the target object at the AF point. There is no limitation to the priority to be determined as the AF point. For example, the priority of the face position may be lower than the priority of the gaze point. In this case, when the eye is not tracked, the gaze point 216 is determined as the AF point.

An image 220 is an image captured multiple frames after the image 210. Since it is after multiple frames, the face of the human body 221 in the image 220 is hidden behind a tree 225. It is assumed that the tracking unit 116 failed to perform tracking of the eye 203 (pattern matching using the area of the eye 203 as the template) for the frame immediately before the image 220, and the target-determining unit 113 has reset the tracking target to the human body. Thus, in the frame of the image 220, the area estimated by the tracking unit 116 (tracking area) is the area of the human body 221. The information-superimposing unit 117 generates a tracking frame 222 based on the tracking result (the position and size of the tracking area). The central control unit 122 then determines the AF point. Here, it is assumed that the position of left eye (tracking result) has the highest priority to be determined as the AF point, followed by the position of right eye (tracking result), the position of face (tracking result), the gaze point, and the position of human body (tracking result) in this order. Accordingly, the central control unit 122 determines a position 223 that is the same as the gaze point 224 as the AF point, and performs focus-lens control based on the calculation result on the distance to the target object at the AF point.

Here, based on the object-detection result obtained by the first detection unit 112, the gaze detecting unit control unit 115 controls to enable or disable the operation of the gaze detecting unit. For example, when a position (tracking result) is obtained that has a higher priority to be determined as the AF point than the gaze point, the gaze point is not determined as the AF point. Thus, the gaze detecting unit control unit 115 disables the operation of the gaze detecting unit to reduce the power consumption of the image-capturing apparatus 100.

Figure 3:
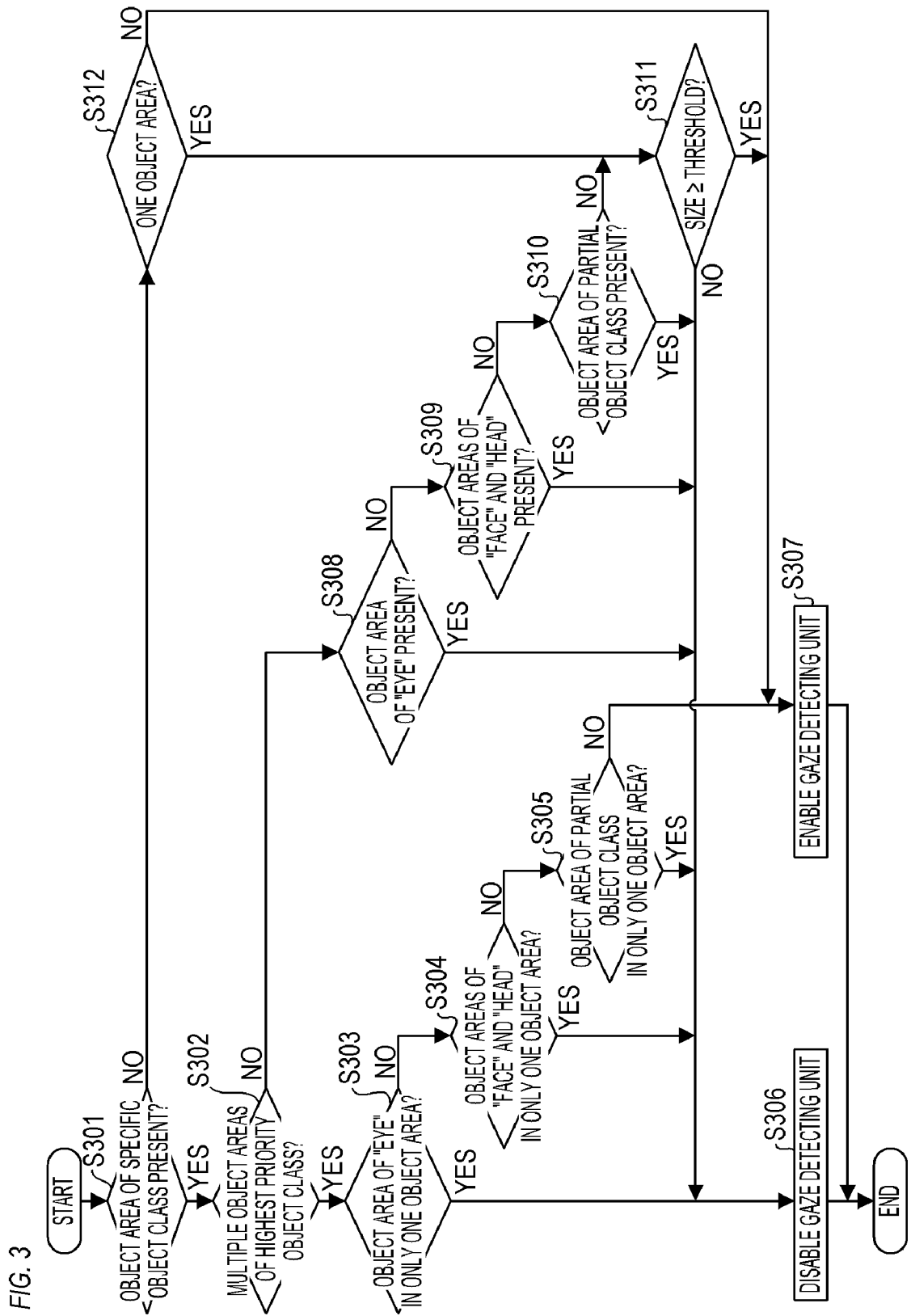
FIG. 3 is a flowchart of an operation according to the first embodiment.

FIG. 3 is a flowchart showing an example of an operation of the image-capturing apparatus 100. FIG. 3 shows an example of an operation of controlling the gaze detecting unit based on the object-detection result.

At step S301, based on the object-detection result, the gaze detecting unit control unit 115 determines whether an object of a specific type is detected, specifically, whether an object area of a specific object class is detected. The gaze detecting unit control unit 115 proceeds to step S302 when an object area of a specific object class is detected, and proceeds to step S312 when an object area of a specific object class is not detected. A specific object class is an object class of a predetermined candidate for tracking (candidate for tracking target) and may be an object class representing an object that can move. In this example, the specific object classes do not include partial object classes such as "head", "face", and "eye". Examples of an object that can move include a mammal (e.g., a human body, a cat, a dog, a horse), a bird, a reptile, a fish, a crustacean, an insect, and a vehicle (e.g., a railroad vehicle, an automobile (e.g., a four-wheeled vehicle, a two-wheeled vehicle), an aircraft, a ship). Examples of a specific object class include "human body", "cat", "dog", "bird", "horse", "other animal", "reptile", "fish", "crustacean", "insect", "train", "automobile", "motorcycle", "airplane", "helicopter", "ship", and "other vehicle".

The gaze detecting unit control unit 115 may proceed to step S306 when an object area of a specific object class is detected. In this case, the object area of the specific object class may be determined as the tracking target. When multiple object areas of specific object classes are detected, one of these object areas may be selected and determined as the tracking target. There is no limitation to the method for selecting an object area. For example, one of the object areas may be randomly selected, or one of the object areas may be selected based on parameters such as the size and position of each object area. The gaze detecting unit control unit 115 may proceed to step S307 when an object area of a specific object class is not detected.

At step S302, the gaze detecting unit control unit 115 determines whether the number of object areas of the object class having the highest predetermined tracking priority among the detected object areas (the object areas of specific object classes) is two or more. The tracking priority is the priority to be determined as the tracking target. The gaze detecting unit control unit 115 proceeds to step S303 when the number is two or more, and proceeds to step S308 when the number is one. Here, it is assumed that "human body" has the highest tracking priority, followed by "dog", "cat", "bird", "horse", "other animal", "automobile", "motorcycle", "train", "airplane", "helicopter", "ship", "other vehicle", "fish", "insect", "reptile", and "crustacean" in this order. For example, when one object area of the object class "dog" and two object areas of the object class "cat" are detected, the gaze detecting unit control unit 115 proceeds to step S308 because the object class having the highest tracking priority is "dog" and only one object area of the object class "dog" is detected.

It should be noted that the user can freely change the tracking priority (the order of the object classes in terms of the tracking priority). For example, the tracking priority may be changed according to the image-capturing mode of the image-capturing apparatus 100, such as a person-priority mode, an animal-priority mode, and a vehicle-priority mode. In the animal-priority mode, the tracking priority is changed such that animal tracking is prioritized. For example, "dog" has the highest tracking priority, followed by "cat", "bird", "horse", "other animal", "human body", "automobile", "motorcycle", "train", "airplane", "helicopter", "ship", "other vehicle", "fish", "insect", "reptile", and "crustacean" in this order. That is, "dog", "cat", "bird", "horse", and "other animal" have higher priority than "human body". To enable the switching of orders of "dog" and "cat", image-capturing modes may include a dog-priority mode and a cat-priority mode, for example. The number of object areas of the object class having the highest tracking priority may be determined from the object-detection result of one frame or may be determined from the average of the object-detection results of multiple frames. The gaze detecting unit control unit 115 may proceed to step S306 when the number of object areas of the object class having the highest tracking priority is one. In this case, the object area of the object class having the highest tracking priority may be determined as the tracking target. The gaze detecting unit control unit 115 may proceed to step S307 when the number of object areas of the object class having the highest tracking priority is two or more.

At step S303, the gaze detecting unit control unit 115 focuses on the multiple object areas of the object class having the highest tracking priority. The gaze detecting unit control unit 115 determines whether an object area of the partial object class "eye" is detected in only one of the multiple object areas. When an object area of the partial object class "eye" is detected in only one of the multiple object areas, the gaze detecting unit control unit 115 proceeds to step S306. In this case, the object area of the partial object class "eye" detected in the object area of the object class having the highest tracking priority is determined as the tracking target. When object areas of the partial object class "eye" are detected in two or more of the multiple object areas, the gaze detecting unit control unit 115 proceeds to step S304. When an object area of the partial object class "eye" is not detected in any of the multiple object areas, the gaze detecting unit control unit 115 also proceeds to step S304. When the object class having the highest tracking priority represents the type of an object with which an eye is not to be detected, the gaze detecting unit control unit 115 also proceeds to step S304.

A partial object class is an object class that represents the type of a partial object (a part of an object). For example, from object areas of the object classes "human body", "dog", "cat", "bird", "horse", and "other animal", object areas of the partial object classes "eye", "head", and "face" may be detected. From object areas of the object classes "fish", "insect", "reptile", and "crustacean", object areas of the partial object class "eye" may be detected. From an object area of the object class "motorcycle", an object area of the partial object class "head (occupant's helmet)" may be detected. From an object area of the object class "automobile", an object area of the partial object class "head (occupant's head)" may be detected. These partial object classes have higher tracking priority than object classes that are not partial object classes.

The gaze detecting unit control unit 115 may proceed to step S307 instead of proceeding to step S304. The object-detection result of one frame or the object-detection results of multiple frames may be used to determine whether an object area of the partial object class "eye" is detected. For example, when a state in which an object area of the partial object class "eye" is detected only in the same single object area continues for multiple frames, the process may proceed to step S306. If not, the process may proceed to step S304.

At step S304, the gaze detecting unit control unit 115 again focuses on the multiple object areas of the object class having the highest tracking priority. The gaze detecting unit control unit 115 determines whether an object area of the partial object class "face" and an object area of the partial object class "head" are detected in only one of the multiple object areas. When object areas of the partial object classes "face" and "head" are detected in only one of the multiple object areas, the gaze detecting unit control unit 115 proceeds to step S306. In this case, the object area of the partial object class "face" or "head" detected from the object area of the object class having the highest tracking priority is determined as the tracking target. When object areas of the partial object classes "face" and "head" are detected in two or more of the multiple object areas, the gaze detecting unit control unit 115 proceeds to step S305. When an object area of the partial object class "face" is not detected in any of the multiple object areas, the gaze detecting unit control unit 115 also proceeds to step S305. When an object area of the partial object class "head" is not detected in any of the multiple object areas, the gaze detecting unit control unit 115 also proceeds to step S305. When the object class having the highest tracking priority represents the type of an object with which a face is not to be detected, the gaze detecting unit control unit 115 also proceeds to step S305. When the object class having the highest tracking priority represents the type of an object with which a head is not to be detected, the gaze detecting unit control unit 115 also proceeds to step S305.

The gaze detecting unit control unit 115 may proceed to step S307 instead of proceeding to step S305. The determination at step S304 may be replaced with the determination as to whether an object area of the partial object class "face" is detected. The determination at step S304 may be replaced with the determination as to whether an object area of the partial object class "head" is detected. In this case, even if an object area of the partial object class "face" is not detected, an object area of the partial object class "head" may be determined as the tracking target. The determination at step S304 may be performed based on the object-detection result of one frame, or may be performed based on the object-detection results of multiple frames. For example, when a state in which object areas of the partial object classes "face" and "head" are detected only in the same single object area continues for multiple frames, the process may proceed to step S306. If not, the process may proceed to step S305.

At step S305, the gaze detecting unit control unit 115 again focuses on the multiple object areas of the object class having the highest tracking priority. The gaze detecting unit control unit 115 determines whether an object area of a partial object class that is not "eye", "face", or "head" is detected in only one of the multiple object areas. When an object area of a partial object class that is not "eye", "face", or "head" is detected in only one of the multiple object areas, the gaze detecting unit control unit 115 proceeds to step S306. In this case, the object area of the partial object class that is not "eye", "face", or "head" detected from the object area of the object class having the highest tracking priority is determined as the tracking target. When object areas of one or more partial object classes that are not "eye", "face", or "head" are detected in two or more of the multiple object areas, the gaze detecting unit control unit 115 proceeds to step S307. When an object area of a partial object class that is not "eye", "face", or "head" is detected in none of the multiple object areas, the gaze detecting unit control unit 115 also proceeds to step S307. When the object class having the highest tracking priority represents the type of an object with which a partial object that is not an eye, face, or head is not to be detected, the gaze detecting unit control unit 115 also proceeds to step S307.

The gaze detecting unit control unit 115 may proceed to step S311 instead of proceeding to step S307. The object-detection result of one frame or the object-detection results of multiple frames may be used to determine whether an object area of a partial object class that is not "eye", "face", or "head" is detected. For example, when a state in which an object area of a partial object class is detected only in the same single object area continues for multiple frames, the process may proceed to step S306. If not, the process may proceed to step S307.

At step S308, the gaze detecting unit control unit 115 determines whether an object area of the partial object class "eye" is detected in the object area of the object class having the highest tracking priority. When an object area of the partial object class "eye" is detected in the object area of the object class having the highest tracking priority, the gaze detecting unit control unit 115 proceeds to step S306. In this case, the object area of the partial object class "eye" detected in the object area of the object class having the highest tracking priority is determined as the tracking target. When an object area of the partial object class "eye" is not detected in the object area of the object class having the highest tracking priority, the gaze detecting unit control unit 115 proceeds to step S309. When the object class having the highest tracking priority represents the type of an object with which an eye is not to be detected, the gaze detecting unit control unit 115 also proceeds to step S309.

At step S308, in the same manner as step S303, the object-detection result of one frame or the object-detection results of multiple frames may be used to determine whether an object area of the partial object class "eye" is detected. The gaze detecting unit control unit 115 may proceed to step S307 instead of proceeding to step S309.

At step S309, the gaze detecting unit control unit 115 determines whether an object area of the partial object class "face" and an object area of the partial object class "head" are detected in the object area of the object class having the highest tracking priority. When object areas of the partial object classes "face" and "head" are detected in the object area of the object class having the highest tracking priority, the gaze detecting unit control unit 115 proceeds to step S306. In this case, the object area of the partial object class "face" or "head" detected from the object area of the object class having the highest tracking priority is determined as the tracking target. When an object area of the partial object class "face" is not detected in the object area of the object class having the highest tracking priority, the gaze detecting unit control unit 115 proceeds to step S310. When an object area of the partial object class "head" is not detected in the object area of the object class having the highest tracking priority, the gaze detecting unit control unit 115 also proceeds to step S310. When the object class having the highest tracking priority represents the type of an object with which a face is not to be detected, the gaze detecting unit control unit 115 also proceeds to step S310. When the object class having the highest tracking priority represents the type of an object with which a head is not to be detected, the gaze detecting unit control unit 115 also proceeds to step S310.

As with the determination at step S304, the determination at step S309 may be replaced with the determination as to whether an object area of the partial object class "face" is detected. The determination at step S309 may be replaced with the determination as to whether an object area of the partial object class "head" is detected. The determination at step S309 may be performed based on the object-detection result of one frame, or may be performed based on the object-detection results of multiple frames. The gaze detecting unit control unit 115 may proceed to step S307 instead of proceeding to step S310.

At step S310, the gaze detecting unit control unit 115 determines whether an object area of a partial object class that is not "eye", "face", or "head" is detected in the object area of the object class having the highest tracking priority. When an object area of a partial object class that is not "eye", "face", or "head" is detected in the object area of the object class having the highest tracking priority, the gaze detecting unit control unit 115 proceeds to step S306. In this case, the object area of the partial object class that is not "eye", "face", or "head" detected from the object area of the object class having the highest tracking priority is determined as the tracking target. When an object area of a partial object class that is not "eye", "face", or "head" is not detected in the object area of the object class having the highest tracking priority, the gaze detecting unit control unit 115 proceeds to step S311. When the object class having the highest tracking priority represents the type of an object with which a partial object that is not an eye, face, or head is not to be detected, the gaze detecting unit control unit 115 also proceeds to step S311.

As with the determination at step S305, the determination at step S310 may be performed based on the object-detection result of one frame, or may be performed based on the object-detection results of multiple frames. The gaze detecting unit control unit 115 may proceed to step S307 instead of proceeding to step S311.

At step S312, the gaze detecting unit control unit 115 calculates the total number of detected object areas of each object class (that is, the total number of detected object areas) and determines whether the calculated number is one. The gaze detecting unit control unit 115 proceeds to step S311 when the calculated number is one, and proceeds to step S307 when the calculated number is two or more or 0 (zero).

The gaze detecting unit control unit 115 may proceed to step S311 when the calculated number is two or more. The total number of object areas may be determined from the object-detection result of one frame, or may be determined from the average of the object-detection results of multiple frames.

At step S311, the gaze detecting unit control unit 115 focuses on one object area. When the process proceeds from step S310 to step S311, the gaze detecting unit control unit 115 focuses on the object area of the specific object class. When the process proceeds from step S312 to step S311, the gaze detecting unit control unit 115 focuses on the object area of an object class that is not a specific object class. The gaze detecting unit control unit 115 determines whether the size of the focused object area is greater than or equal to a predetermined threshold. The gaze detecting unit control unit 115 proceeds to step S307 when the size of the focused object area is greater than or equal to the predetermined threshold, and proceeds to step S306 when the size of the focused object area is less than the predetermined threshold. When the process proceeds to step S306, the object area focused at step S311 is determined as the tracking target.

As described above, at step S305, the gaze detecting unit control unit 115 may proceed to step S311 instead of proceeding to step S307. In this case, the gaze detecting unit control unit 115 focuses on one of the multiple object areas of a specific object class. At step S312, the gaze detecting unit control unit 115 may proceed to step S311 when the total number of detected object areas is two or more. In this case, the gaze detecting unit control unit 115 focuses on one of the detected multiple object areas. There is no limitation to the method for selecting the object area to be focused. For example, one of the object areas may be randomly selected, or one of the object areas may be selected based on parameters such as the size and position of each object area. The object-detection result of one frame or the object-detection results of multiple frames may be used to determine whether the size of the focused object area is greater than or equal to the predetermined threshold. For example, when a state in which the size of the focused object area is less than the predetermined threshold continues for multiple frames, the process may proceed to step S306. If not, the process may proceed to step S307.

Furthermore, as the threshold to be compared with the size of the focused object area, a different threshold may be predetermined for each object class. In one example, an image stored in the tracking memory 110 (a captured image) may be 160 pixels in the horizontal direction and 120 pixels in the vertical direction. In this case, a size of 40 pixels in the horizontal direction×30 pixels in the vertical direction may be set as the threshold to be compared with the size of an object area of the object class "train". A size of 80 pixels in the horizontal direction×60 pixels in the vertical direction may be set as the threshold to be compared with the size of an object area of the object class "flower".

At step S306, the gaze detecting unit control unit 115 controls to disable the operation of the gaze detecting unit so that the gaze detection (operation of detecting the user's gaze) is not performed. For example, the gaze detecting unit control unit 115 controls to disable the operation of at least one of the first infrared-light irradiating unit 111, the second imaging element 120, the third preprocessing unit 121, and the second detection unit 126. This reduces the power consumption of the image-capturing apparatus 100. Step S306 is performed when the gaze point is not needed to determine the AF point (the tracking target is used). As such, disabling the operation of the gaze detecting unit does not cause any problems. For example, when the process proceeds from step S303 to step S306, that is, when an object area of the partial object class "eye" is detected in only one of the multiple object areas of the object class having the highest tracking priority, the central control unit 122 determines the position of the object area of the partial object class "eye" (tracking result) as the AF point. Thus, even if the operation of the gaze detecting unit is disabled, autofocusing on the object is performed in a suitable manner (with normal performance).

At step S307, the gaze detecting unit control unit 115 controls to enable the operation of the gaze detecting unit so as to perform gaze detection. For example, the gaze detecting unit control unit 115 controls to set the operation cycles of the first infrared-light irradiating unit 111, the second imaging element 120, the third preprocessing unit 121, and the second detection unit 126 to predetermined operation cycles. Step S307 is performed when the gaze point is used to determine the AF point. As such, the operation of the gaze detecting unit needs to be enabled. In one example, the process may proceed from step S311 to step S307, that is, the size of the focused object area is greater than or equal to the predetermined threshold. In this case, when the gaze point is present in the focused object area, the central control unit 122 determines the gaze point as the AF point. Thus, although the power consumption of the image-capturing apparatus 100 increases, the gaze detecting unit is enabled so that autofocusing is performed in a suitable manner.

Step S306 may be performed when the possibility of using the gaze point is low. Step S306 may also be performed when the gaze point is not used to determine the AF point but is used by other operations. When performing step S306, the gaze detecting unit may be used as a general-purpose input apparatus. For example, when performing step S306, icons of different image-capturing modes may be displayed on the display unit 118, and a change of the image-capturing mode may be determined based on the gaze point and the gazing time. In this case, the gaze detecting unit cannot be disabled. For this reason, at step S306, the gaze detecting unit control unit 115 may control to set the operation cycle of the gaze detecting unit to an operation cycle longer than the operation cycle determined at step S307. For example, when step S307 sets an operation cycle of 1/60 seconds (operation cycle of performing 60 operations per second), step S306 may set an operation cycle of 1/30 seconds (operation cycle of performing 30 operations per second). When step S307 sets an operation cycle of 1/120 seconds (operation cycle of performing 120 operations per second), step S306 may set an operation cycle of 1/60 seconds or 1/30 seconds. The gaze detecting unit control unit 115 may control to set the operation cycle of at least one of the first infrared-light irradiating unit 111, the second imaging element 120, the third preprocessing unit 121, and the second detection unit 126 to an operation cycle longer than the operation cycle set at the step S307. A longer operation cycle reduces the execution frequency of the operation (the number of times the operation is executed per unit time), thereby reducing the power consumption of the image-capturing apparatus 100.

Furthermore, the gaze detecting unit control unit 115 may control the operation of one of the first infrared-light irradiating unit 111, the second imaging element 120, the third preprocessing unit 121, and the second detection unit 126, or two or more (some or all) of them. When the operation cycles of two or more of the first infrared-light irradiating unit 111, the second imaging element 120, the third preprocessing unit 121, and the second detection unit 126 are controlled, these operation cycles may be controlled to be the same or different.

The method for controlling the operation of the gaze detecting unit is not limited to the above method. At step S306 or step S307, the gaze detecting unit control unit 115 may change the operation cycle of the gaze detecting unit according to the object-detection result. For example, when three or more object areas of the object class "human body" are detected and also an object area of an object class relating to sport such as "ball" or "racket" is detected, the gaze detecting unit control unit 115 may determine that the user is capturing an image of a sport and determine the shortest operation cycle, such as 1/240 seconds, as the operation cycle of the gaze detecting unit. When one object area of the object class "food" is detected and the size of this object area is greater than or equal to the predetermined threshold, the gaze detecting unit control unit 115 may determine that the user is capturing an image of food and determines a long operation cycle, such as 1/15 seconds, as the operation cycle of the gaze detecting unit. When one object area of the object class "train" is detected and the size of this object area is greater than or equal to the predetermined threshold, the gaze detecting unit control unit 115 may determine that the user is capturing an image of a train and determines a short operation cycle, such as 1/60 seconds, as the operation cycle of the gaze detecting unit.

When only one object area of the object class "human body" is detected while the user is capturing an image of a sport, this object area is likely to be the area of the athlete (player) on whom the user wants to focus. Thus, when only one object area of the object class "human body" is detected, the position of the object area of the object class "human body" may be determined as the AF point without using the gaze point. Also, while the user is capturing an image of a sport, the gaze detecting unit control unit 115 may control the operation of the gaze detecting unit according to the number of object areas of the object class "human body". When only one object area of the object class "human body" is detected and also an object area of an object class relating to sport such as "ball" or "racket" is detected, the position of the object area of the object class "human body" may be determined as the AF point without using the gaze point. For this reason, the gaze detecting unit control unit 115 may disable the operation of the gaze detecting unit, or may lengthen the operation cycle of the gaze detecting unit. When multiple object areas of the object class "human body" are detected and an object area of an object class relating to sport is detected, it is not easy to determine on which one of the multiple object areas of the object class "human body" the user wants to focus. For this reason, the gaze detecting unit control unit 115 may enable the operation of the gaze detecting unit, or may shorten the operation cycle of the gaze detecting unit.

Figure 4:
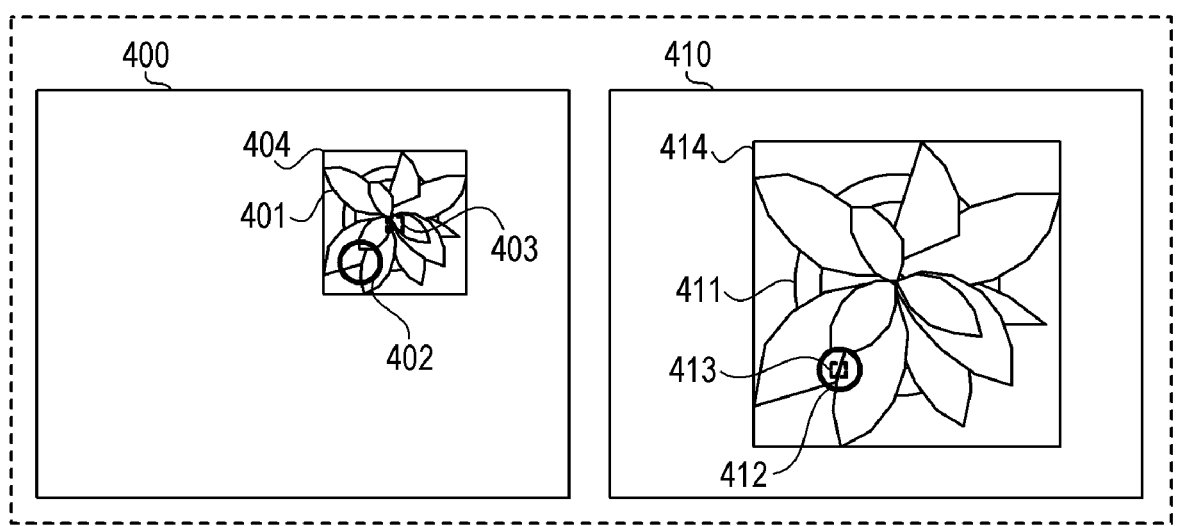
FIG. 4 is a schematic view of images according to the first embodiment.

FIG. 4 shows an example of images captured by the first imaging element 102 and displayed on the display unit 118, gaze points, AF points, and the like. Referring to FIG. 4, a specific example of the operation of FIG. 3 is now described. The following description is directed to a case in which step S306 and step S307 are switched depending on the size of an object area.

An image 400 is an image captured by the first imaging element 102 and displayed on the display unit 118. The image 400 shows a potted flower 401. The first detection unit 112 detects an object area 404 circumscribing the potted flower 401 from the image 400 stored in the tracking memory 110. The first detection unit 112 generates information about the object area 404, including the object class "flower" and the size of the object area 404 (40 pixels in the horizontal direction×40 pixels in the vertical direction). Since the object class "flower" is not a specific object class (predetermined candidate for tracking), the process proceeds from step S301 to step S312. Also, since the total number of detected object areas is one, the process proceeds from step S312 to step S311. In this example, the threshold (threshold to be compared with the size of the object area) used at step S311 is set to a size of 80 pixels in the horizontal direction× 60 pixels in the vertical direction. Since the size of the object area 404 (40 pixels in the horizontal direction×40 pixels in the vertical direction) is less than the threshold, the process proceeds to step S306, so that the operation of the gaze detecting unit is disabled. Since the operation of the gaze detecting unit is disabled, the central control unit 122 determines the center position 403 of the object area 404 as the AF point, instead of the gaze point 402. Also, since the operation of the gaze detecting unit is disabled, the gaze point 402 is neither detected nor displayed.

An image 410 is an image displayed by the display unit 118 on a frame (timing) different from that of the image 400. The image 410 shows a potted flower 411. The first detection unit 112 detects an object area 414 circumscribing the potted flower 411 from the image 410 stored in the tracking memory 110. The first detection unit 112 generates information about the object area 414, including the object class "flower" and the size of the object area 414 (90 pixels in the horizontal direction×90 pixels in the vertical direction). As with the image 400, the process proceeds to step S311. Since the size of the object area 414 (90 pixels in the horizontal direction×90 pixels in the vertical direction) is greater than or equal to the threshold (80 pixels in the horizontal direction×60 pixels in the vertical direction), the process proceeds to step S307, so that the operation of the gaze detecting unit is enabled. Since the operation of the gaze detecting unit is enabled, the central control unit 122 determines a position 413 that is the same as the gaze point 412 as the AF point, instead of the center position of the object area 414.

In this manner, when the size of the object area is greater than or equal to the predetermined threshold, the gaze detecting unit is enabled and the gaze point is determined as the AF point, so that the autofocusing is performed at the AF point that is desired by the user. Furthermore, when the size of the object area is less than the predetermined threshold, the power consumption of the image-capturing apparatus 100 can be reduced by disabling the gaze detecting unit. When the object area (object) is small, in many cases, selecting any position in the object area as the AF point will result in substantially the same image being captured after autofocusing. Accordingly, even if the gaze point is not determined as the AF point (even if the center position of the object area is determined as the AF point), the autofocusing can be substantially performed as intended by the user.

As described above, based on the object-detection result, the first embodiment controls the operation of the gaze detecting unit to be enabled or disabled, or controls the operation cycle of the gaze detecting unit. This allows gaze detection to be enabled or accelerated only when needed. In other words, gaze detection can be disabled or slowed down when not needed. As a result, the image-capturing apparatus 100 consumes less power while limiting a decrease in the accuracy of the process that uses gaze detection. The first infrared-light irradiating unit 111 of the gaze detecting unit emits light and thus consumes relatively large power, and the second imaging element 120 of the gaze detecting unit captures images and thus consumes relatively large power. Accordingly, a significant effect can be expected in terms of the reduction of the power consumption of the gaze detecting unit.

Examples of situations that require gaze detection are as follows.
 A fast-moving object (candidate for tracking) is detected.
 The size of the object is large, and the AF point should be selected inside the object.
 A combination of objects, such as a person and a ball, is detected that suggests that the user is capturing (or about to capture) an image of a sport.
 Multiple objects are detected.
 No object is detected.

Examples of situations that do not require gaze detection are as follows.
 Only one object of a specific type is detected, such as an eye or the helmet of an occupant of a motorcycle, and the position to be determined as the AF point is clear.
 The size of the object is small, and the position to be determined as the AF point is clear.

According to the first embodiment, the following operations are possible when capturing an image of a train. When the train approaches from a distance, the gaze detection is disabled and the center position of the train is determined as the AF point because the size of the train in the captured image is less than the threshold. When the train approaches and the size of the train in the images greater than or equal to the threshold, the gaze detection is enabled, and the gaze point is determined as the AF point. Then, when the train moves away and the size of the train in the image becomes less than the threshold, the gaze detection is disabled, and the center position of the train is determined as the AF point.

Second Embodiment

A second embodiment of the present invention is now described. In the following, the items (such as configuration and processing) that are the same as those in the first embodiment are not described, and the items different from the first embodiment are described. In the second embodiment, the gaze detecting unit control unit 115 controls the operation of the gaze detecting unit based on the object-detection result only when the image-capturing apparatus 100 is set to a specific mode.

Figure 5:
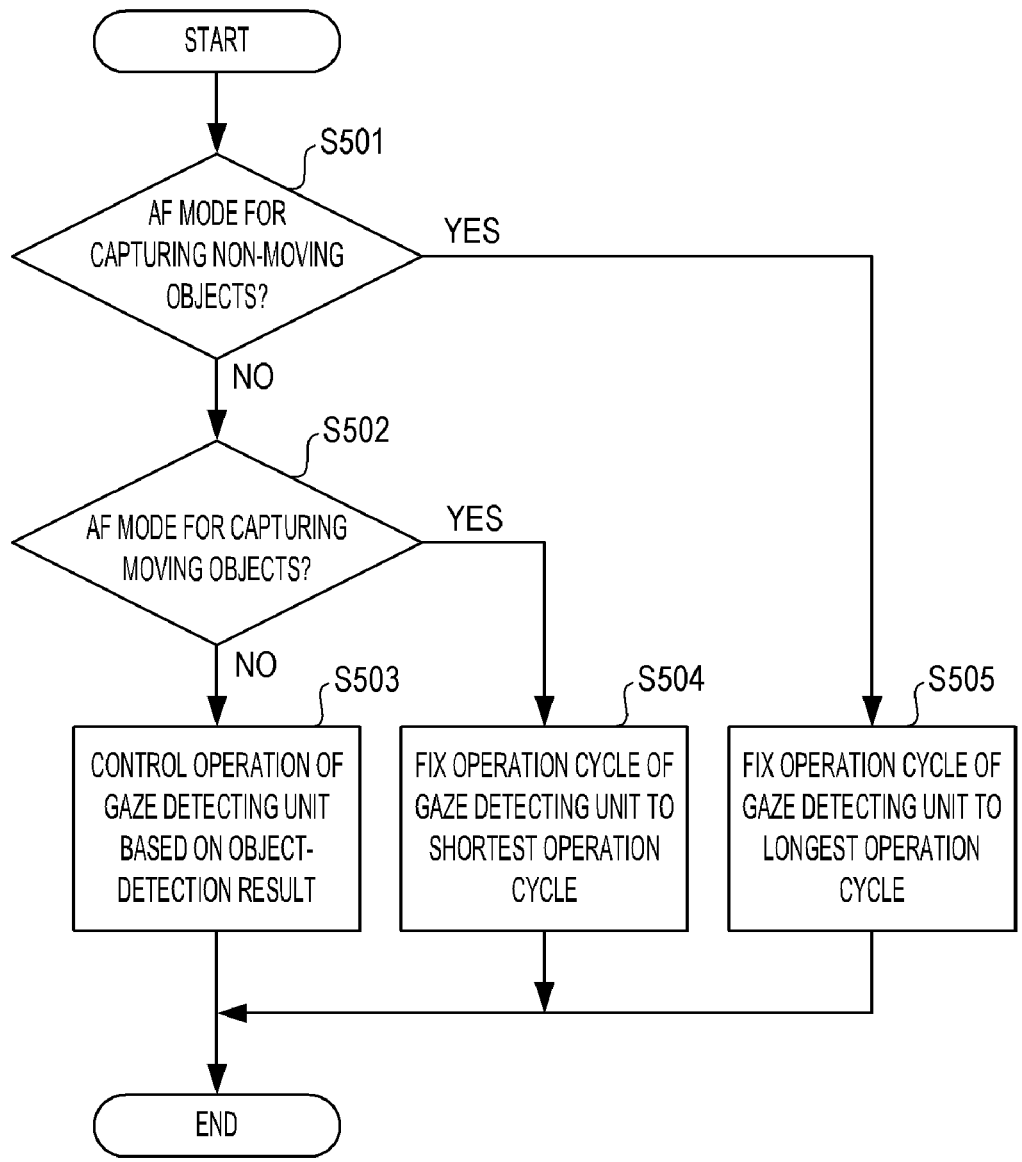
FIG. 5 is a flowchart of an operation according to a second embodiment.

FIG. 5 is a flowchart showing an example of an operation of the image-capturing apparatus 100 according to the second embodiment. FIG. 5 shows an example of an operation of controlling the gaze detecting unit based on the image-capturing mode of the image-capturing apparatus 100.

At step S501, the gaze detecting unit control unit 115 determines whether the image-capturing mode of the image-capturing apparatus 100 is an AF mode for capturing non-moving objects. The gaze detecting unit control unit 115 proceeds to step S502 when the image-capturing mode of the image-capturing apparatus 100 is not the AF mode for capturing non-moving objects, and proceeds to step S505 when the image-capturing mode of the image-capturing apparatus 100 is the AF mode for capturing non-moving objects.

At step S502, the gaze detecting unit control unit 115 determines whether the image-capturing mode of the image-capturing apparatus 100 is an AF mode for capturing moving objects. The gaze detecting unit control unit 115 proceeds to step S503 when the image-capturing mode of the image-capturing apparatus 100 is not the AF mode for capturing moving objects, and proceeds to step S504 when the image-capturing mode of the image-capturing apparatus 100 is the AF mode for capturing moving objects. In the second embodiment, it is assumed that the AF mode for capturing non-moving objects, the AF mode for capturing moving objects, or an automatic determination AF mode is set as the AF mode. Accordingly, the process proceeds to step S503 when the image-capturing mode of the image-capturing apparatus 100 is the automatic determination AF mode. The automatic determination AF mode is an AF mode in which the determination on a moving object or a non-moving object is performed automatically for image capturing.

At step S503, the gaze detecting unit control unit 115 controls the operation of the gaze detecting unit based on the object-detection result. For example, the gaze detecting unit control unit 115 controls the gaze detecting unit through the operation shown in FIG. 3.

At step S504, the gaze detecting unit control unit 115 enables the operation of the gaze detecting unit to capture an image of a moving object, and fixes the operation cycle of the gaze detecting unit to the shortest operation cycle (for example, 1/240 seconds). The operation of the gaze detecting unit is not controlled based on the object-detection result.

At step S505, the gaze detecting unit control unit 115 enables the operation of the gaze detecting unit to capture an image of a non-moving object, and fixes the operation cycle of the gaze detecting unit to the longest operation cycle (for example, 1/5 seconds). The operation of the gaze detecting unit is not controlled based on the object-detection result.

As described above, according to the second embodiment, the operation of the gaze detecting unit is controlled based on the object-detection result only in a specific mode. This reduces the power consumption of the image-capturing apparatus 100 and improves the convenience of the image-capturing apparatus 100.

Third Embodiment

A third embodiment of the present invention is now described. In the following, the items (such as configuration and processing) that are the same as those in the first embodiment are not described, and the items different from the first embodiment are described. The infrared light emitted by the first infrared-light irradiating unit 111 to detect a gaze may reduce the accuracy of eye-proximity detection. The infrared light emitted by the second infrared-light irradiating unit 129 to sense eye proximity may reduce the accuracy of gaze detection. For example, any interference between the infrared light emitted by the first infrared-light irradiating unit 111 and the infrared light emitted by the second infrared-light irradiating unit 129 may reduce the accuracy of gaze detection and eye-proximity detection. For this reason, the third embodiment controls the state (operation) of the eye-proximity sensing unit 128 according to the state of the gaze detecting unit.

Figure 6:
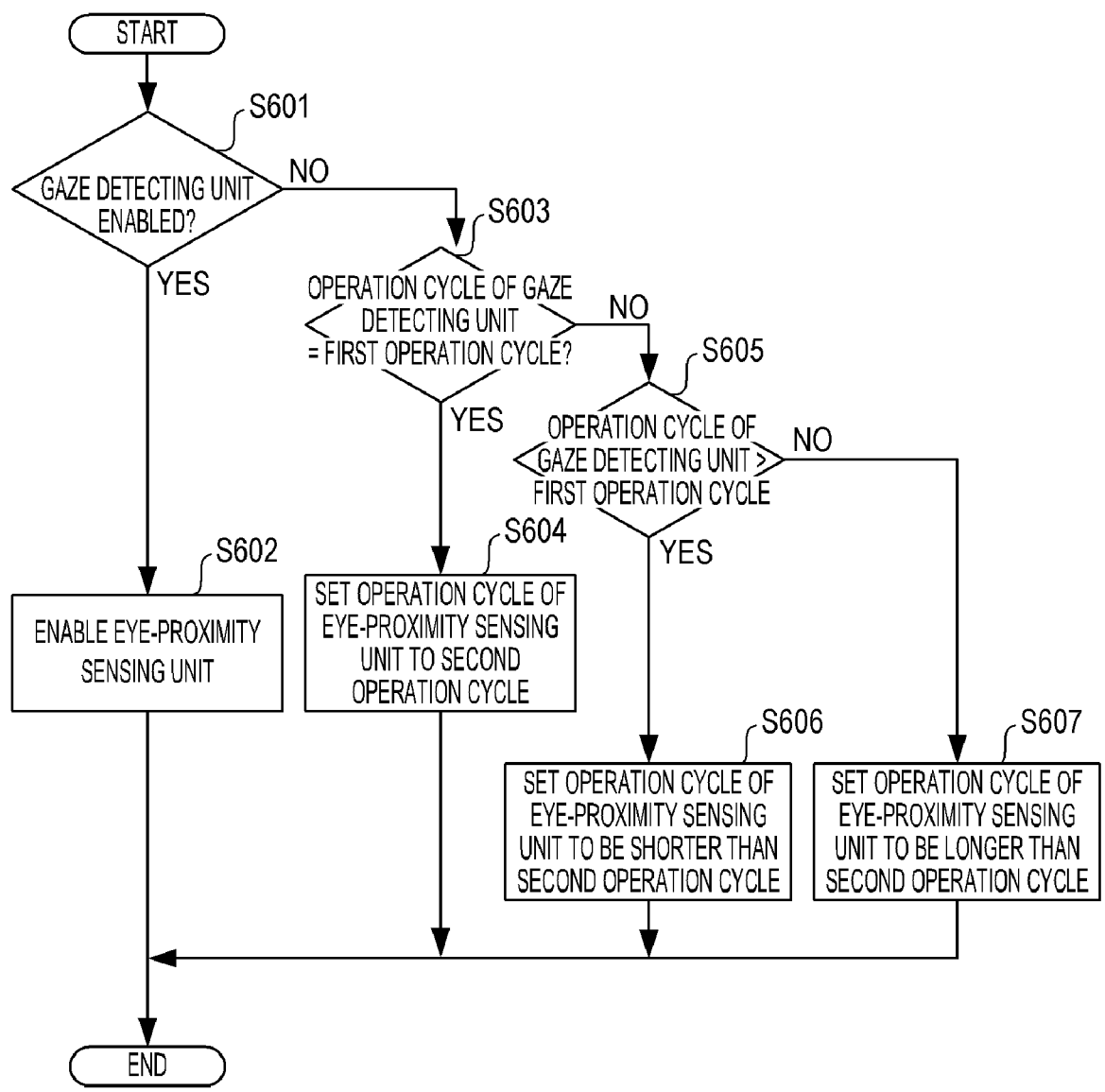
FIG. 6 is a flowchart of an operation according to a third embodiment.

FIG. 6 is a flowchart showing an example of an operation of the image-capturing apparatus 100 according to the third embodiment. FIG. 6 shows an example of an operation of controlling the state (operation) of the eye-proximity sensing unit 128 according to the state of the gaze detecting unit.

At step S601, the gaze detecting unit control unit 115 determines whether the operation of the gaze detecting unit (e.g., the first infrared-light irradiating unit 111 and the second imaging element 120) is enabled. The gaze detecting unit control unit 115 proceeds to step S602 when the operation of the gaze detecting unit is not enabled (disabled), and proceeds to step S603 when the operation of the gaze detecting unit is enabled.

At step S602, since the operation of the gaze detecting unit is not enabled, the gaze detecting unit control unit 115 determines that the operation of the eye-proximity sensing unit 128 (the second infrared-light irradiating unit 129 and the infrared-light sensing unit 131) can be freely controlled. For example, since the second imaging element 120 does not capture the infrared light emitted by the second infrared-light irradiating unit 129, the gaze detecting unit control unit 115 determines that the second infrared-light irradiating unit 129 is allowed to emit infrared light. Also, since the first infrared-light irradiating unit 111 does not emit infrared light, which would otherwise be incident on the infrared-light sensing unit 131, the gaze detecting unit control unit 115 determines that the infrared-light sensing unit 131 is allowed to receive incident infrared light. As such, the gaze detecting unit control unit 115 enables the operation of the eye-proximity sensing unit 128. A shorter operation cycle of the eye-proximity sensing unit 128 increases the responsiveness in sensing eye proximity. Thus, the gaze detecting unit control unit 115 preferably shortens the operation cycle of the eye-proximity sensing unit 128. For example, when the shortest operation cycle of the eye-proximity sensing unit 128 is 1/120 seconds, the gaze detecting unit control unit 115 may set the operation cycle of the eye-proximity sensing unit 128 to 1/120 seconds.

At step S603, the gaze detecting unit control unit 115 determines whether the operation cycle of the gaze detecting unit is a predetermined operation cycle (first operation cycle). For example, the first operation cycle is the operation cycle used when the operation shown in FIG. 3 is not performed. The operation of FIG. 3 may result in the operation cycle of the gaze detecting unit being set to an operation cycle that is longer or shorter than the first operation cycle. The gaze detecting unit control unit 115 proceeds to step S604 when the operation cycle of the gaze detecting unit is the first operation cycle, and proceeds to step S605 when the operation cycle of the gaze detecting unit is not the first operation cycle.

At step S604, the gaze detecting unit control unit 115 controls to set the operation cycle of the eye-proximity sensing unit 128 to a predetermined operation cycle (second operation cycle). The second operation cycle, which is the operation cycle of the eye-proximity sensing unit 128, is determined based on the first operation cycle, which is the operation cycle of the gaze detecting unit.

Figure 7:
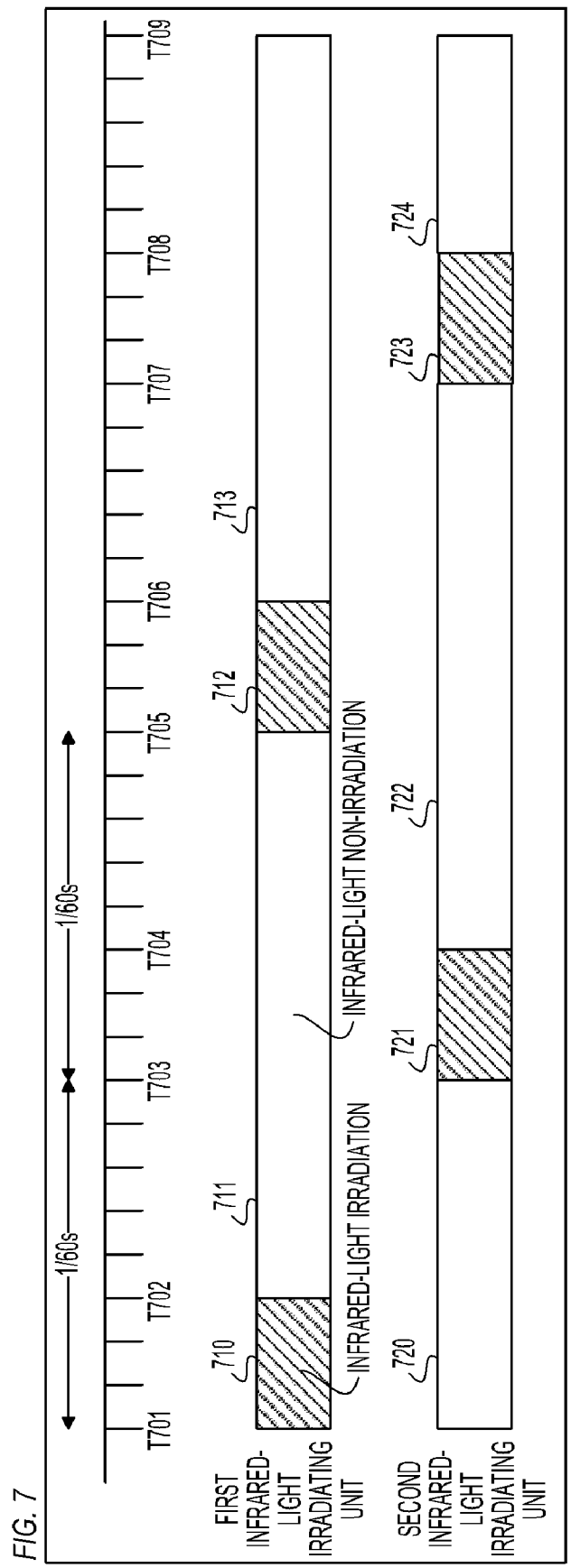
FIG. 7 is a schematic view of an operation according to the third embodiment.

FIG. 7 shows an example of the operation of the first infrared-light irradiating unit 111 in the first operation cycle and the operation of the second infrared-light irradiating unit 129 in the second operation cycle. The time from timing T701 to timing T703 and the time from timing T703 to timing T705 are both 1/60 seconds. The time from timing T705 to timing T707 and the time from timing T707 to timing T709 are both 1/60 seconds.

In this example, the first infrared-light irradiating unit 111 operates as follows. In the following operation, the first infrared-light irradiating unit 111 is turned on (infrared-light irradiation) and turned off (infrared-light non-irradiation) once every 1/30 seconds. That is, the operation cycle of the first infrared-light irradiating unit 111 is set to 1/30 seconds (first operation cycle).

Infrared light is emitted from timing T701 to timing T702 (infrared-light irradiation 710).

Infrared light is not emitted from timing T702 to timing T705 (infrared-light non-irradiation 711).

Infrared light is emitted from timing T705 to timing T706 (infrared-light irradiation 712).

Infrared light is not emitted from timing T706 to timing T709 (infrared-light non-irradiation 713).

In accordance with the above operation of the first infrared-light irradiating unit 111, the second infrared-light irradiating unit 129 operates as follows. In the following operation, the second infrared-light irradiating unit 129 is turned on (infrared-light irradiation) and turned off (infrared-light non-irradiation) once every 1/30 seconds. That is, the operation cycle of the second infrared-light irradiating unit 129 is also set to 1/30 seconds (second operation cycle).

Infrared light is not emitted from timing T701 to timing T703 (infrared-light non-irradiation 720).

Infrared light is emitted from timing T703 to timing T704 (infrared-light irradiation 721).

Infrared light is not emitted from timing T704 to timing T707 (infrared-light non-irradiation 722).

Infrared light is emitted from timing T707 to timing T708 (infrared-light irradiation 723).

Infrared light is not emitted from timing T708 to timing T709 (infrared-light non-irradiation 724).

As described above, in the example of FIG. 7, both the first infrared-light irradiating unit 111 and the second infrared-light irradiating unit 129 operate with an operation cycle of 1/30 seconds. However, to reduce (or eliminate) the duration in which both the first infrared-light irradiating unit 111 and the second infrared-light irradiating unit 129 are turned on, the periods of infrared-light irradiation 721 and 723 of the second infrared-light irradiating unit 129 do not coincide with the periods of infrared-light irradiation 710 and 712 of the first infrared-light irradiating unit 111. Separating the periods of infrared-light irradiation of the second infrared-light irradiating unit 129 from the periods of infrared-light irradiation of the first infrared-light irradiating unit 111 reduces the influence of the infrared light of the first infrared-light irradiating unit 111 on eye-proximity detection and the influence of the infrared light of the second infrared-light irradiating unit 129 on gaze detection.

It should be noted that FIG. 7 is an example, and the first and second infrared-light irradiating units 111 and 129 may be controlled in any manner as long as the periods of infrared-light irradiation of the first infrared-light irradiating unit 111 do not coincide with the periods of infrared-light irradiation of the second infrared-light irradiating unit 129. The first operation cycle may be longer or shorter than ¹/₃₀ seconds, the second operation cycle may be longer or shorter than ¹/₃₀ seconds, the second operation cycle may be the same as the first operation cycle, and the second operation cycle may be different from the first operation cycle. For example, by tolerating a decrease in the responsiveness of eye-proximity detection, the operation cycle (second operation cycle) of the eye-proximity sensing unit 128 may be set to ¹/₁₅ fps to reduce the power consumption of the eye-proximity sensing unit 128. When lengthening the operation cycle of the eye-proximity sensing unit 128, the duration of each infrared-light non-irradiation may be lengthened without changing the duration of each infrared-light irradiation. Thus, when the operation cycle of the gaze detecting unit is constant, a longer operation cycle of the eye-proximity sensing unit 128 facilitates the separation of the periods of infrared-light irradiation of the second infrared-light irradiating unit 129 from the periods of infrared-light irradiation of the first infrared-light irradiating unit 111, and also facilitates the limitation of a decrease in the accuracy of gaze detection and eye-proximity detection.

At step S605, the gaze detecting unit control unit 115 determines whether the operation cycle of the gaze detecting unit is set to an operation cycle that is longer than the first operation cycle. When the operation cycle of the gaze detecting unit is set to an operation cycle that is longer than the first operation cycle, the gaze detecting unit control unit 115 proceeds to step S606. When the operation cycle of the gaze detecting unit is not set to an operation cycle longer than the first operation cycle (specifically, it is set to an operation cycle shorter than the first operation cycle), the gaze detecting unit control unit 115 proceeds to step S607.

At step S606, since the operation cycle of the gaze detecting unit is longer than the first operation cycle, the gaze detecting unit control unit 115 sets the operation cycle of the eye-proximity sensing unit 128 to be shorter than the second operation cycle. When the operation cycle of the first infrared-light irradiating unit 111 is long, the duration of infrared-light non-irradiation of the first infrared-light irradiating unit 111 (the time between successive infrared-light irradiations) is long. In this case, it is easy to separate the periods of infrared-light irradiation of the second infrared-light irradiating unit 129 from the periods of infrared-light irradiation of the first infrared-light irradiating unit 111. As such, the gaze detecting unit control unit 115 sets the operation cycle of the eye-proximity sensing unit 128 to be shorter than the second operation cycle to increase the responsiveness of eye-proximity detection.

At step S607, since the operation cycle of the gaze detecting unit is shorter than the first operation cycle, the gaze detecting unit control unit 115 sets the operation cycle of the eye-proximity sensing unit 128 to be longer than the second operation cycle. When the operation cycle of the first infrared-light irradiating unit 111 is short, the duration of infrared-light non-irradiation of the first infrared-light irradiating unit 111 (the time between successive infrared-light irradiations) is short. In this case, it is more difficult to separate the periods of infrared-light irradiation of the second infrared-light irradiating unit 129 from the periods of infrared-light irradiation of the first infrared-light irradiating unit 111. For this reason, the gaze detecting unit control unit 115 sets the operation cycle of the eye-proximity sensing unit 128 to be longer than the second operation cycle and separates the periods of infrared-light irradiation of the second infrared-light irradiating unit 129 from the periods of infrared-light irradiation of the first infrared-light irradiating unit 111.

As described above, according to the third embodiment, the state (operation) of the eye-proximity sensing unit 128 is controlled according to the state of the gaze detecting unit. This reduces the influence of the infrared light of the first infrared-light irradiating unit 111 on eye-proximity detection and the influence of the infrared light of the second infrared-light irradiating unit 129 on gaze detection, thereby limiting a decrease in the accuracy of gaze detection and eye-proximity detection.

Fourth Embodiment

A fourth embodiment of the present invention is now described. In the following, the items (such as configuration and processing) that are the same as those in the first embodiment are not described, and the items different from the first embodiment are described. The fourth embodiment controls the operation of the gaze detecting unit based on the remaining battery level of the image-capturing apparatus.

Figure 8:
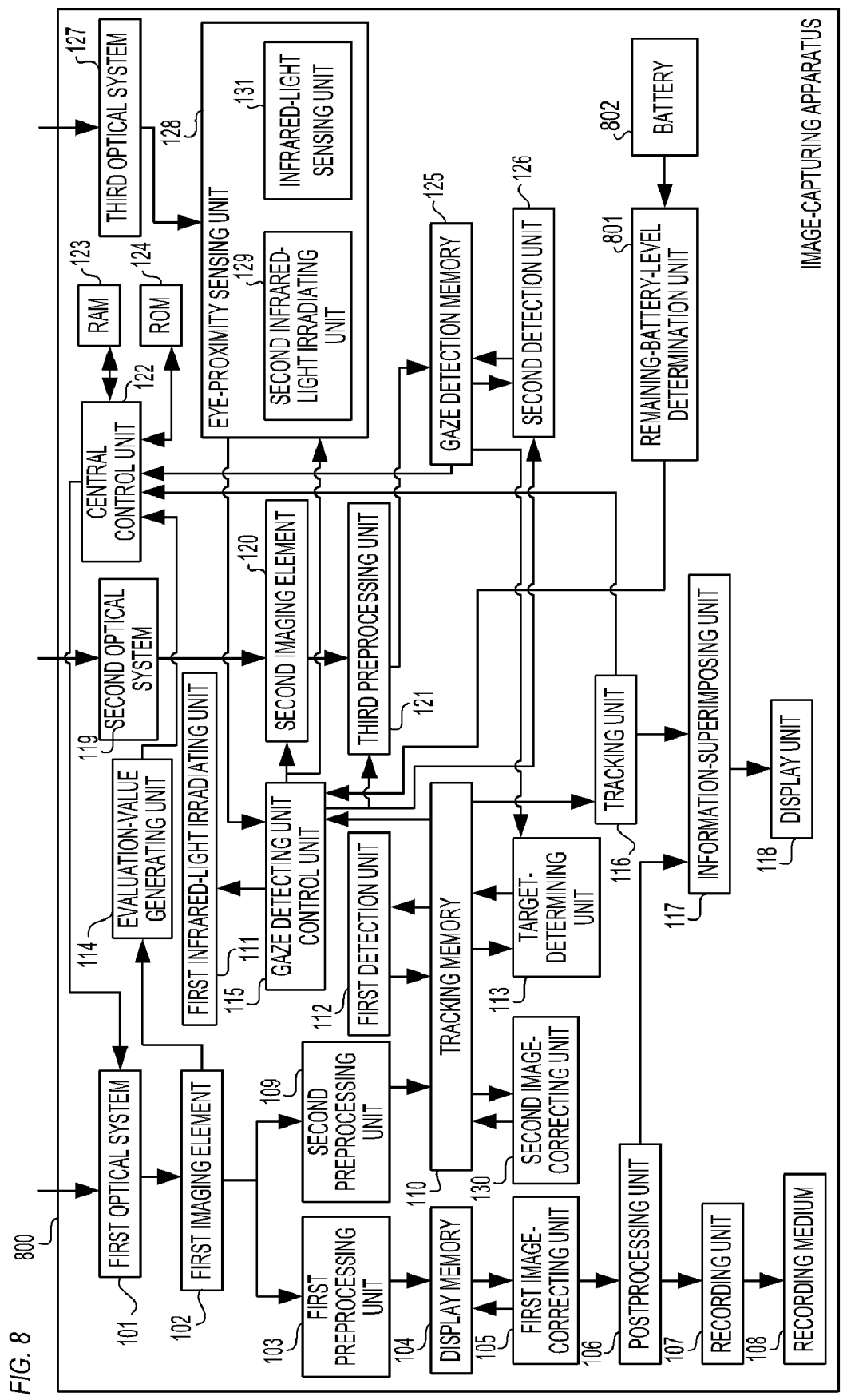
FIG. 8 is a block diagram of an image-capturing apparatus according to a fourth embodiment.

FIG. 8 is a block diagram schematically showing an example of the internal structure of an image-capturing apparatus 800 according to the fourth embodiment. The image-capturing apparatus 800 has a configuration in which a battery 802 and a remaining-battery-level determination unit 801 are added to the image-capturing apparatus 100 shown in FIG. 1. The battery 802 supplies electric power to the components of the image-capturing apparatus 800 to drive the components. The remaining-battery-level determination unit 801 determines whether the image-capturing apparatus 800 (battery 802) is in a low battery state, and outputs the determination result (remaining-battery-level determination result) to the gaze detecting unit control unit 115. The low battery state is a state in which the remaining battery level of the battery 802 is less than or equal to a predetermined threshold. The gaze detecting unit control unit 115 controls the operation of the gaze detecting unit based on the remaining-battery-level determination result.

Figure 9:
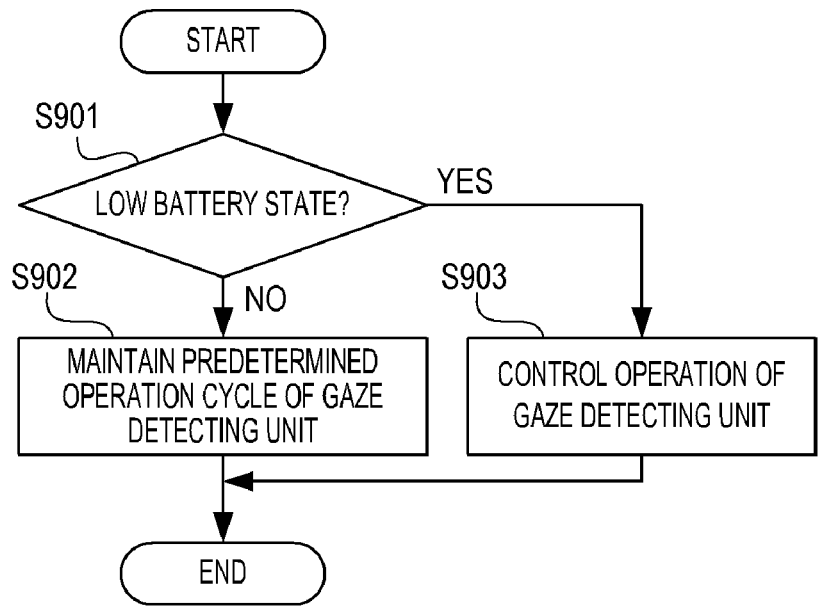
FIG. 9 is a flowchart of an operation according to the fourth embodiment.

FIG. 9 is a flowchart showing an example of an operation of the image-capturing apparatus 800. FIG. 9 shows an example of an operation of controlling the gaze detecting unit based on a remaining-battery-level determination result. The gaze detecting unit is assumed to be operating with a predetermined operation cycle at the start of the operation of FIG. 9.

At step S901, the gaze detecting unit control unit 115 determines whether the remaining-battery-level determination result obtained from the remaining-battery-level determination unit 801 indicates the low battery state. The gaze detecting unit control unit 115 proceeds to step S902 when the remaining-battery-level determination result does not indicate the low battery state, and proceeds to step S903 when the remaining-battery-level determination result indicates the low battery state.

At step S902, since the battery 802 is not in the low battery state, the gaze detecting unit control unit 115 does not change the operation cycle of the gaze detecting unit from the predetermined operation cycle.

At step S903, since the battery 802 is in the low battery state, the gaze detecting unit control unit 115 controls the operation of the gaze detecting unit. For example, the gaze detecting unit control unit 115 controls the gaze detecting unit through the operation shown in FIG. 3.

The operation of FIG. 9 may be combined with the operations of FIGS. 5 and 6. For example, the operation of FIG. 5 is not performed when the battery 802 is not in the low battery state, and the operation of FIG. 5 may be performed when the battery 802 is in the low battery state. Alternatively, the operation of FIG. 5 may be performed when the battery 802 is not in the low battery state, and the operation of FIG. 3 is performed when the battery 802 is in the low battery state.

Furthermore, instead of switching between presence and absence of the control of operation of the gaze detecting unit according to whether the battery 802 is in the low battery state, the method for controlling the operation of the gaze detecting unit may be switched. For example, the gaze detecting unit may be controlled through the operation of FIG. 3 regardless of whether the battery 802 is in the low battery state, but step S311 in FIG. 3 may be skipped and the process proceeds to step S307 when the battery 802 is in the low battery state.

As described above, the fourth embodiment controls the operation of the gaze detecting unit based on the result of determination on whether the battery 802 is in the low battery state. For example, when the battery 802 is not in the low battery state, the operation cycle of the gaze detecting unit may be set to the predetermined operation cycle. When the battery 802 is in the low battery state, the operation of the gaze detecting unit may be controlled based on the object-detection result. As a result, when the remaining battery level is low, the operation of the gaze detecting unit is disabled or slowed down based on the object-detection result to reduce the power consumption of the image-capturing apparatus 800. This increases the duration in which the image-capturing apparatus 800 can capture images. When the remaining battery level is high, the gaze detecting unit can be operated at high speed with a short operation cycle, improving the operability of various operations that use the gaze.

It should be noted that the first to fourth embodiments are merely examples, and the present invention also encompasses configurations obtained by appropriately modifying or changing the configurations of the first to fourth embodiments within the scope of the present invention. The present invention also includes configurations obtained by appropriately combining configurations of the first to fourth embodiments.

For example, in the examples described above, the present invention is applied to an image-capturing apparatus having a structure of a mirrorless single-lens camera, but the image-capturing apparatus to which the present invention is applicable is not limited to a mirrorless single-lens camera and may be other apparatuses such as a single-lens reflex camera. That is, the user may look into the finder and see the optical image of the object itself, instead of the image displayed on the display unit.

The image-capturing apparatus of the present invention may be a smartphone, a tablet terminal, or the like. For example, a smartphone captures an image with a rear camera provided on the back of the smartphone, and displays the image captured by the rear camera on a display unit provided on the front of the smartphone. Additionally, the smartphone detects the user's gaze using a front camera provided on the front of the smartphone. Then, the smartphone detects the object from the image captured by the rear camera, and controls the operation of the front camera and the like based on the detection result.

The image-capturing apparatus of the present invention may be an eyeglasses-type (goggles-type) wearable terminal. For example, an eyeglasses-type wearable terminal may include a camera that captures an image of the viewing area of the user wearing the terminal and a gaze detection sensor that detects the gaze of the user. The eyeglasses-type wearable terminal detects an object from the image captured by the camera, and controls the operation of the gaze detection sensor or the like based on the detection result. Such a wearable terminal may use augmented reality (AR) technology, for example. That is, the present invention is applicable to electronic apparatuses (e.g., AR glasses) that use the AR technology. Similarly, the present invention is applicable to electronic apparatuses that use other XR technologies such as virtual reality (VR) technology, mixed reality (MR) technology, and substitutional reality (SR) technology.

According to the present disclosure, it is possible to reduce the power consumption of the image-capturing apparatus capable of detecting the gaze of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-113636, filed on Jul. 8, 2021, which is hereby incorporated by reference herein in its entirety.

What is claimed is:

1. An image-capturing apparatus comprising:
an image sensor;
a gaze detecting sensor configured to detect a gaze of a user; and
at least one memory and at least one processor which function as:
an object-detecting unit configured to detect an object from an image captured by the image sensor; and
a control unit configured to, if the object-detecting unit detects an object of a specific type in a case where a state of the gaze detecting sensor is a first state for detecting the gaze, change the state of the gaze detecting sensor to a second state in which an electric power consumption of the gaze detecting sensor is less than in the first state, wherein in a case where the state of the gaze detecting sensor is the first state, even if the object-detecting unit does not detect an object of the specific type, if the object-detecting unit detects an object having a size smaller than a threshold size, the control unit changes the state of the gaze detecting sensor to the second state.

2. The image-capturing apparatus according to claim 1, wherein the gaze detecting sensor includes at least one of an irradiation member configured to irradiate the user with infrared light, a second image sensor configured to capture an image of the user, and a detector configured to detect the gaze of the user based on the image captured by the second image sensor.

3. The image-capturing apparatus according to claim 1, wherein the object of the specific type is an object which is a candidate for tracking.

4. The image-capturing apparatus according to claim 1, wherein the object of the specific type is an movable object.

5. The image-capturing apparatus according to claim 1, wherein the object of the specific type includes at least one of a living being of a mammal, a living being of a bird, a living being of a reptile, a living being of a fish, a living being of a crustacean, an insect, and a vehicle.

6. The image-capturing apparatus according to claim 1, wherein the object of the specific type includes at least one of a human body, a cat, a dog, and a horse.

7. The image-capturing apparatus according to claim 1, wherein the object of the specific type includes at least one of a railroad vehicle, an automobile, an aircraft, and a ship.

8. The image-capturing apparatus according to claim 1, wherein the second state is a state in which an operation of the gaze detecting sensor is stopped.

9. The image-capturing apparatus according to claim 1, wherein the second state is a state in which an operation cycle of the gaze detecting sensor is longer than in the first state.

10. The image-capturing apparatus according to claim 1, wherein the object-detecting unit detects, from the image, an object and a partial object that is a part of the object.

11. The image-capturing apparatus according to claim 10, wherein in a case where the state of the gaze detecting sensor is the first state, even if the object-detecting unit detects an object of the specific type, if the object-detecting unit does not detect a partial object of the object, the control unit does not change the state of the gaze detecting sensor.

12. The image-capturing apparatus according to claim 11, wherein in a case where the state of the gaze detecting sensor is the first state and the object-detecting unit detects an object of the specific type, even if the object-detecting unit does not detect a partial object of the object, if a size of the object is smaller than a threshold size, the control unit, changes the state of the gaze detecting sensor to the second state.

13. The image-capturing apparatus according to claim 11, wherein
each of a plurality of types that differ in priority is predetermined as the specific type, and
in a case where the state of the gaze detecting sensor is the first state and the object-detecting unit detects objects of a plurality of specific types, the control unit changes the state of the gaze detecting sensor based on a result of detection by the object-detecting unit with regard to one specific type of the specific types that has the highest priority.

14. The image-capturing apparatus according to claim 10, wherein in a case where the state of the gaze detecting sensor is the first state, even if the object-detecting unit detects an object of the specific type, if the object-detecting unit detects a plurality of objects of a same type as objects of the specific type and detects a plurality of partial objects of a same type respectively corresponding to the plurality of objects, the control unit does not change the state of the gaze detecting sensor.

15. The image-capturing apparatus according to claim 10, wherein
in a case where the state of the gaze detecting sensor is the first state and the object-detecting unit detects a plurality of objects of a same type as objects of the specific type,
if a partial object of a first type is detected in only one of the plurality of objects, the control unit changes the state of the gaze detecting sensor to the second state,
even if partial objects of the first type are detected in two or more of the objects, if a partial object of a second type is detected in only one of the plurality of objects, the control unit changes the state of the gaze detecting sensor to the second state,
even if partial objects of the first type are detected in two or more of the objects and partial objects of the second type are detected in two or more of the objects, if a partial object of a third type is detected in only one of the plurality of objects, the control unit changes the state of the gaze detecting sensor to the second state, and
if partial objects of the first type are detected in two or more of the objects, partial objects of the second type are detected in two or more of the objects, and partial objects of the third type are detected in two or more of the objects of the plurality of objects, the control unit does not change the state of the gaze detecting sensor.

16. The image-capturing apparatus according to claim 10, wherein the partial object includes an eye.

17. The image-capturing apparatus according to claim 10, wherein the partial object includes a head.

18. The image-capturing apparatus according to claim 10, wherein the partial object includes a face.

19. The image-capturing apparatus according to claim 1, wherein in a case where the state of the gaze detecting sensor is the first state, even if the object-detecting unit does not detect an object of the specific type and detects an object having a size smaller than the threshold size, if the object-detecting unit detects a plurality of objects, the control unit does not change the state of the gaze detecting sensor.

20. The image-capturing apparatus according to claim 1, wherein
the object of the specific type includes a human body, and
the object having the size smaller than the threshold size includes a flower.

21. A control method of an image-capturing apparatus including an image sensor and a gaze detecting sensor configured to detect a gaze of a user, the control method comprising:
a step of detecting an object from an image captured by the image sensor; and
a step of, if an object of a specific type is detected from the image in a case where a state of the gaze detecting sensor is a first state for detecting the gaze, changing the state of the gaze detecting sensor to a second state in which an electric power consumption of the gaze detecting sensor is less than in the first state, wherein in a case where the state of the gaze detecting sensor is the first state, even if an object of the specific type is not detected, if an object having a size smaller than a threshold size is detected, the state of the gaze detecting sensor is changed to the second state.

22. A non-transitory computer readable medium that stores a program, wherein the program causes a computer to execute a control method of an image-capturing apparatus including an image sensor and a gaze detecting sensor configured to detect a gaze of a user, the control method comprising:

a step of detecting an object from an image captured by the image sensor; and a step of, if an object of a specific type is detected from the image in a case where a state of the gaze detecting sensor is a first state for detecting the gaze, changing the state of the gaze detecting sensor to a second state in which an electric power consumption of the gaze detecting sensor is less than in the first state, wherein in a case where the state of the gaze detecting sensor is the first state, even if an object of the specific type is not detected, if an object having a size smaller than a threshold size is detected, the state of the gaze detecting sensor is changed to the second state.

\* \* \* \* \*